US012395884B2

(12) United States Patent
Gundavelli et al.

(10) Patent No.: US 12,395,884 B2
(45) Date of Patent: Aug. 19, 2025

(54) ADAPTIVE QUALITY OF SERVICE FOR ENTERPRISE TRAFFIC

(71) Applicant: Cisco Technology, Inc., San Jose, CA (US)

(72) Inventors: Srinath Gundavelli, San Jose, CA (US); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 378 days.

(21) Appl. No.: 17/234,193

(22) Filed: Apr. 19, 2021

(65) Prior Publication Data

US 2021/0243642 A1     Aug. 5, 2021

Related U.S. Application Data

(62) Division of application No. 15/844,655, filed on Dec. 18, 2017, now Pat. No. 11,032,733.

(51) Int. Cl.
*H04W 28/02*     (2009.01)
*H04L 12/14*     (2024.01)
(Continued)

(52) U.S. Cl.
CPC ..... *H04W 28/0268* (2013.01); *H04L 12/1407* (2013.01); *H04L 47/2441* (2013.01);
(Continued)

(58) Field of Classification Search
CPC ............. H04L 12/1407; H04L 47/2441; H04L 63/0272; H04L 65/1069; H04L 65/80;
(Continued)

(56) References Cited

U.S. PATENT DOCUMENTS 8,005,087 B2    8/2011   Dolganow et al.
9,264,942 B2    2/2016   Nilanjan et al.
(Continued)

FOREIGN PATENT DOCUMENTS

| CN | 103533527 A | 1/2014 |
|---|---|---|
| EP | 3065371 | 9/2016 |
| WO | 2017034511 | 3/2017 |

OTHER PUBLICATIONS

Extended European Search Report in counterpart European Application No. 22195229.4, mailed Dec. 19, 2022, 17 pages.
(Continued)

*Primary Examiner* — Derrick W Ferris
*Assistant Examiner* — M Mostazir Rahman

(57) ABSTRACT

In one embodiment, an apparatus comprising networking circuitry adapted to receive, at a mobile network operated by an SP, flows associated with enterprise applications executing on device(s) in an enterprise network, the device(s) including a CPE and/or one or more devices behind the CPE, and processing circuitry adapted to vary, during a duration in which there is IP connectivity between the CPE and the mobile network, a pool of dedicated bearers for binding the flows, in response to at least part of changes occurring during the duration with respect to the flows, wherein the changes include variations during the duration in number of the flows and/or differences during the duration in detected characteristics of the flows, the detected characteristics of the flows having been detected based on inspection of respective packet(s) of the flows, and bind at least part of the flows to respective dedicated bearers included in the pool.

20 Claims, 10 Drawing Sheets

(51) Int. Cl.
*H04L 47/2441* (2022.01)
*H04L 65/80* (2022.01)
*H04M 15/00* (2006.01)
*H04W 28/16* (2009.01)
*H04W 72/543* (2023.01)
*H04W 72/56* (2023.01)
*H04W 76/22* (2018.01)
*H04L 9/40* (2022.01)

(52) U.S. Cl.
CPC ............ *H04L 65/80* (2013.01); *H04M 15/57* (2013.01); *H04M 15/66* (2013.01); *H04M 15/80* (2013.01); *H04W 28/0263* (2013.01); *H04W 28/16* (2013.01); *H04W 72/543* (2023.01); *H04W 72/56* (2023.01); *H04W 76/22* (2018.02); *H04L 63/0272* (2013.01); *H04M 15/77* (2013.01)

(58) Field of Classification Search
CPC ...... H04M 15/57; H04M 15/66; H04M 15/77; H04M 15/80; H04W 28/0263; H04W 28/0268; H04W 28/16; H04W 72/543; H04W 72/56; H04W 76/22
IPC ......... H04L 12/14; H04M 15/00; H04W 28/02, 28/16, 76/22
See application file for complete search history.

(56) References Cited

U.S. PATENT DOCUMENTS

| | | | |
|---|---|---|---|
| 2014/0198644 A1 | 7/2014 | Basilier et al. | |
| 2016/0036833 A1* | 2/2016 | Ardeli | H04L 63/101 726/22 |
| 2016/0183119 A1 | 6/2016 | Tjandra et al. | |
| 2016/0212668 A1 | 7/2016 | Castro Castro et al. | |
| 2016/0234124 A1 | 8/2016 | Tomici et al. | |
| 2017/0048857 A1 | 2/2017 | Vajapeyam et al. | |
| 2017/0272990 A1* | 9/2017 | Mutikainen | H04W 36/30 |
| 2018/0049227 A1 | 2/2018 | Moon et al. | |
| 2018/0069798 A1* | 3/2018 | Bacik | H04L 43/026 |
| 2018/0241671 A1 | 8/2018 | Bosch et al. | |
| 2018/0270839 A1 | 9/2018 | Loehr et al. | |
| 2019/0124671 A1* | 4/2019 | Starsinic | H04W 4/60 |

OTHER PUBLICATIONS

Bhagat, Amit N., "Default Bearer Setup", Dec. 18, 2017, 5 pages.
Wikipedia, "QOS Class Indentifier", Dec. 12, 2017, 3 pages.
Do, Michelle M., "LTE QoS (Part 2)—LTE QoS Parameters (QCI, ARP, GBR, MBR and AMBR)", Oct. 15, 2013, 5 pages.
Technical Specification, "3rd Generation Partnership Project; Technical Specification Group Services and System Aspects; Policy and charging control architecture (Release 12)", 3GPP TS 23.203 V12.0.0, Mar. 2013, XP050691808, pp. 1-100.
Technical Specification, "3rd Generation Partnership Project; Technical Specification Group Services and System Aspects; Policy and charging control architecture (Release 12)", 3GPP TS 23.203 V12.0.0, Mar. 2013, XP050691808, pp. 101-184.
Partial International Search Report in counterpart International Application No. PCT/US2018/065073, mailed Mar. 22, 2019, 18 pages.
International Search Report and Written Opinion in counterpart International Application No. PCT/US2018/065073, mailed May 13, 2019, 19 pages.
Examination Report in counterpart European Application No. 18842681.1, mailed Apr. 9, 2021, 9 pages.
European Search Report for European Application No. 24186855.3, dated Aug. 2, 2024, 14 Pages.
Office Action for counterpart European Application No. 22195229.4, mailed Mar. 5, 2024, 78 pages.

* cited by examiner

ADAPTIVE QUALITY OF SERVICE FOR ENTERPRISE TRAFFIC

CROSS REFERENCE TO RELATED APPLICATION

This application is a divisional of U.S. application Ser. No. 15/844,655, filed Dec. 18, 2017, the entirety of which is incorporated herein by reference.

TECHNICAL FIELD

The present disclosure generally relates to mobile networks.

BACKGROUND

Some mobile operators offer private routing services over mobile networks (also referred to herein as cellular networks). Headquarters and branch offices of an enterprise may be linked via private routing services. By leveraging wireless connections for the last mile, mobile operators are able to eliminate costs associated with wired connections on the last mile and are able to offer private routing services at competitive pricing. Hardware and/or software associated with linking various sites, route management, and segregation of enterprise traffic from other traffic, resides in the mobile network. Private routing services are expected to grow, especially with the greater data speeds of 5G.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
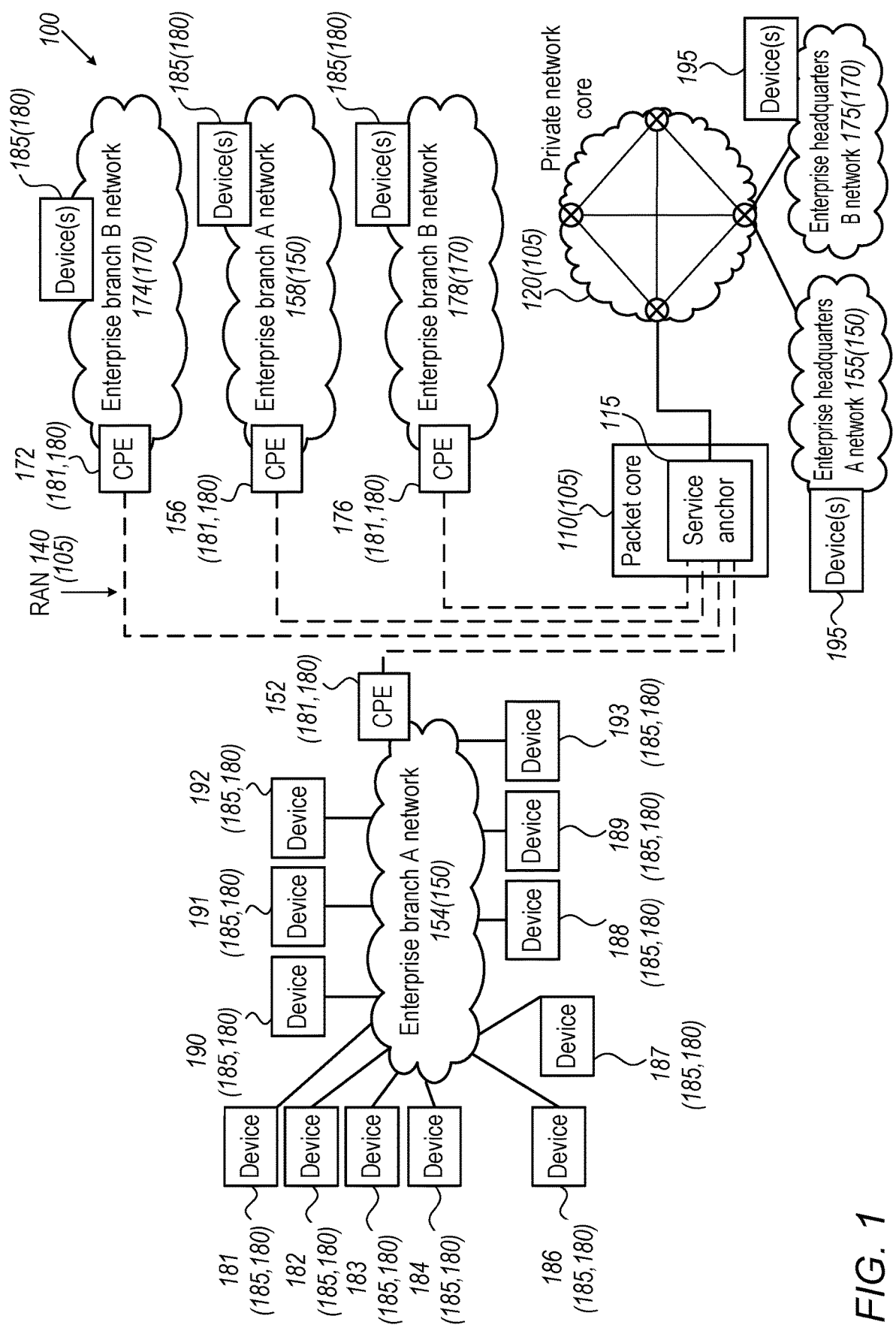
FIG. 1 is a block diagram of a system, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the elements, blocks, stages, etc. of a given system, apparatus, method, etc.

DESCRIPTION OF EXAMPLE EMBODIMENTS

Overview

There is provided, in accordance with some embodiments of the presently disclosed subject matter, an apparatus comprising networking circuitry adapted to receive, at a mobile network operated by a service provider, flows associated with enterprise applications executing on at least one device in an enterprise network, wherein the at least one device includes at least one of a customer premises equipment or one or more devices behind the customer premises equipment, and processing circuitry adapted to vary, during a duration in which there is internet protocol (IP) connectivity between the customer premises equipment and the mobile network, a pool of dedicated bearers for binding the flows, in response to at least part of changes occurring during the duration with respect to the flows, wherein the changes include at least one of variations during the duration in number of the flows, or differences during the duration in detected characteristics of the flows, the detected characteristics of the flows having been detected based on inspection of respective one or more packets of the flows, and bind at least part of the flows to respective dedicated bearers included in the pool.

There is further provided, in accordance with some embodiments of the presently disclosed subject matter, a method comprising receiving, at a mobile network operated by a service provider, a flow associated with an enterprise application, wherein the enterprise application is executing on a customer premises equipment of an enterprise network or on a device behind the customer premises equipment, and binding the flow to a particular dedicated bearer associated with a particular set of quality of service attributes suitable for binding the flow, wherein one or more characteristics of the flow were detected based on an inspection of one or more packets of the flow, and wherein the binding includes determining whether or not there is any existing dedicated bearer associated with quality of service (QOS) attributes suitable for binding the flow, and upon determination that there is at least one existing dedicated bearer associated with quality of services attributes suitable for binding the flow, binding the flow to one of the at least one existing dedicated bearer associated with quality of services attributes suitable for binding the flow, the one of the at least one existing dedicated bearer being the particular dedicated bearer and a set of quality of service attributes associated with the one of the at least one existing dedicated bearer being the particular set of quality of service attributes, or upon determination that there is no existing dedicated bearer associated with quality of service attributes suitable for binding the flow, then performing one of the following depending on at least one criterion, updating an existing set of quality of service attributes associated with an existing dedicated bearer, yielding an updated set of quality of attributes suitable for binding the flow, and binding the flow to the existing dedicated bearer, the existing dedicated bearer being the particular dedicated bearer and the updated set of quality attributes being the particular set of quality of service attributes, or creating a new dedicated bearer associated with a new set of quality of service attributes that is suitable for binding the flow, and binding the flow to the new dedicated bearer, the new dedicated bearer being the particular dedicated bearer and the new set of quality of service attributes being the particular set of quality of service attributes.

EXAMPLE EMBODIMENTS

FIG. 1 is a block diagram of a system 100, in accordance with some embodiments of the presently disclosed subject matter.

System 100 is shown including a mobile network 105. Mobile network 105 includes elements operated by a mobile operator (also referred to herein as a service provider (SP)), such as a radio access network (RAN) 140, a packet core 110 (also referred to as a core network), and a private network core 120. RAN140 may use 3G, 4G or 5G radio access technology, conforming to the 3GPP standard. For instance, RAN 140 may use long term evolution (LTE) technology. RAN 140 may include, for instance, one or more cellular base stations such as one or more enodeB, nodeB, gNB, femtocell, microcell, etc. In FIG. 1 packet core 110 is shown including a service anchor 115, which will be described in more detail below, e.g. with reference to FIGS. 9 and 10, but in other embodiments at least part of the functionality attributed herein to service anchor 115 may be located elsewhere in mobile network 105. Packet core 110 may be a 3GPP packet core, for instance, for 3G, 4G or 5G cellular network technology. Private network core 120 may include, for example, public infrastructure; and may be adapted to route traffic (e.g. data and/or control packets) relating to various enterprises in respective private networks that are overlaid on the public infrastructure. Such private networks are referred to in the art as virtual private networks (VPNs). Routing of enterprise traffic in a mobile network such as mobile network 105 (e.g. via VPNs) is referred to in the art as enterprise private routing or mobile local loop. Private network core 120 may, for instance, use multiprotocol label switching (MPLS) for the routing.

In FIG. 1, system 100 is shown including two enterprise networks 150 and 170, labeled as enterprise A and enterprise B respectively. However, one or more enterprise networks may be included in system 100, depending on the embodiment. Enterprise A network 150 for enterprise A, and enterprise B network 170 for enterprise B may include elements at respective headquarters site and at respective one or more branch office sites. The branch office site(s) for an enterprise may be remote from one another and from the headquarters site for the enterprise, and therefore communication between elements at various sites may be via mobile network 105. It is noted that a particular site may span any appropriate geographical area (e.g. a floor, a building, a plurality of city blocks, etc.)

More specifically, enterprise A network 150 is shown as including an enterprise headquarters A network 155 and two enterprise branch office A networks 154 and 158. Enterprise B network 170 is shown as including an enterprise headquarters B network 175 and two enterprise branch office B networks 174 and 178.

Enterprise branch office networks 154, 158, 174, and 178 may include a plurality of devices 180. Devices 180 may include one or more customer premises equipments (CPEs) 181. In FIG. 1, four CPEs 181 are shown, namely CPEs 152 and 156 in enterprise branch office A networks 154 and 158 respectively; and CPEs 172 and 176 in enterprise branch office B networks 174 and 178 respectively. Devices 180 may further include devices 185 behind respective CPEs 181. Devices 185 are adapted to connect (via wired and/or wireless connections) with respective CPEs 181, and are therefore referred to as being behind the respective CPEs 181. Examples of any such device 185 may include a laptop computer, a desktop computer, a phone with Wi-Fi, a VoIP phone, an Internet of Thing (IoT) device such as a sensor or any other "thing", etc. Any such device 185 is optionally mobile. Twelve devices 185 are shown in FIG. 1 behind CPE 152 for enterprise branch office A network 154, namely devices 181, 182, 183, 184, 186, 187, 188, 189, 190, 191, 192 and 193.

CPEs 181 are adapted to communicate with packet core 110 via radio access network 140, and adapted to communicate via wired and/or wireless connections with respective devices 185 that are behind the CPEs 181. CPEs 181 may therefore include any appropriate devices for communicating wirelessly with packet core 110 via radio access network 140, as well as wirelessly and/or via wired connections with devices 185. Examples of appropriate CPEs 181 may include routers, switches, modems, gateways, adaptors, devices performing functionality of a combination of the above etc. In some embodiments CPEs 181 may include Cisco® Integrated Services Router (ISR) series routers, and/or CPEs 181 may act as wide access network (WAN) gateways providing internet connectivity for end-user devices 185. Any CPE 181 is optionally mobile.

Enterprise headquarters networks 155 and 175 may include one or more devices 195 adapted to connect with private network core 120 via wired connection(s). Examples of any such device 195 may include a CPE, a phone, a laptop, a desktop, an IoT device such as a sensor or any other thing, etc. Any such device 195 is optionally mobile.

In some embodiments, CPE(s), if any, among devices 195 in enterprise headquarters networks 155 and/or 175 may additionally or alternatively communicate with packet core 110 via radio access network 140, and communicate via wired and/or wireless connections with respective devices that are behind the CPEs. Additionally, or alternatively, in such embodiments, one or more devices 180 in enterprise branch office network 154, 158, 174, and/or 178 may be adapted to connect with private network core 120 via wired connection(s).

Various enterprise applications may be executed (i.e. may run) on devices 180 and 195 of enterprise networks 150 and 170. An enterprise application may be any application (i.e. software) that runs on a device in an enterprise network (e.g. on any device 180 or 195). The packet flows (also referred to herein as traffic flows or simply as "flows") for various enterprise applications may require different levels of qualities of service. However, as the number of devices 180 or 195 per site (e.g. per network 154, 155, 158, 174, 175 or 178 at a site) increases, the probability increases that the flows for two or more enterprise applications running at a site (e.g. at a branch office site or headquarters site) may require similar quality of service (QOS). For example, enterprise applications at a branch office site associated with flows having a similar quality of service may run on a particular CPE (e.g. CPE 152) included in the enterprise network (e.g. enterprise branch office A network 154) at the site and/or on device(s) (e.g. 186, 187, etc.) behind the particular CPE, although more typically the enterprise applications run on device(s) behind the particular CPE. The flows of enterprise applications may require a similar quality of service, if the flows share one or more flow characteristics. Therefore, in some embodiments of the presently disclosed subject the flows may be handled on an aggregated flow basis, as will be explained in more detail below.

Enterprise applications running on devices 180 and 195 may be agnostic with respect to the routing of data and/or control packets ("packets") of flows associated with the enterprise applications. In other words, it may not matter to the enterprise applications of enterprise A or B whether or not the traffic for the enterprise applications remains in network 150 or 170, operated respectively by the enterprise A or B, or is routed via mobile network 105. Therefore, enterprise applications may lack topology awareness and therefore lack the ability to identify on-path router(s) (e.g. in mobile network 105) on a flow basis.

Moreover, enterprise applications may lack interfaces to trigger the creation of dedicated bearers by mobile network 105 for private network traffic (e.g. traffic that is routed in private core 120). For example, a given CPE (e.g. CPE 152) may not be configurable (e.g. may include a non-configurable low cost external cellular modem) and therefore may not allow for the realization of a proprietary signaling interface between the given CPE and enterprise applications running on devices behind the given CPE (e.g. any of devices 181, 182, 183, 184, 186, 187, 188, 189, 190, 191, 192 and 193 behind CPE 152). Therefore such enterprise applications may not be adapted to communicate with an application function (AF) in mobile network 105 in order to trigger the creation of dedicated bearers. Additionally or alternatively, it may not be desirable for mobile network 105 to provide an interface to a given CPE (e.g. CPE 152) for private network traffic.

It is noted that in contrast, an application on a user equipment of a customer of a mobile operator (e.g. a customer for public network traffic) may be adapted to communicate with an AF such as an Internet Protocol (IP) multimedia core network subsystem (IMS), thereby triggering the creation of a dedicated bearer. The communication may cause the AF to signal on an Rx interface to a policy and charging rules function (PCRF). The PCRF may then signal on a Gx interface to a policy and charging enforcement function (PCEF) of the packet data network gateway (PGW), and the PCEF of the PGW may consequently create a dedicated bearer for the traffic of the application.

Even if enterprise applications were to somehow be made topographically aware, and were to be adapted to trigger dedicated bearer creation, for instance through an application programming interface (API) to an AF, such triggering may significantly increase the load on the PCRF and PCEF. For example, if for every CPE (e.g. CPEs 181, CPEs among devices 195, etc.) for every enterprise with private traffic, dedicated bearer creation requests were to be triggered by enterprise applications executing on such CPEs and on devices behind such CPEs (e.g. devices 185, devices 195 that are behind CPEs.), there may be a significant load on the PCRF and PCEF. On the other hand, if dedicated bearers are created when a CPE becomes operational (or in other words begins to have IP connectivity with mobile network 105) after not being operational, and the dedicated bearers are maintained for the CPE (or in other words the dedicated bearers are static) for the duration that the CPE is operational (i.e. continues to have IP connectivity with mobile network 105), the dedicated bearers may not match the possibly changing requirements of the enterprise applications.

Therefore various embodiments of the subject matter that will be elaborated upon below may include one or more of the following advantages. First, dedicated bearer creation may not necessarily require a trigger from an enterprise application. Second, the dedicated bearer creation may not necessarily require the involvement of the PCRF. Third, the triggering (e.g. inspection of packets) which triggers the creation of dedicated bearers, and the dedicated bearer creation are optionally both performed by a user plane anchor (e.g. by a PGW). Fourth, a pool of dedicated bearers for a given CPE may be dynamic (or in other words adaptive, varying during the duration that a given CPE is operational), as will be explained in more detail below. Fifth, the flows are optionally handled on an aggregated flow basis. Other advantages may be apparent from the description below.

Figure 2:
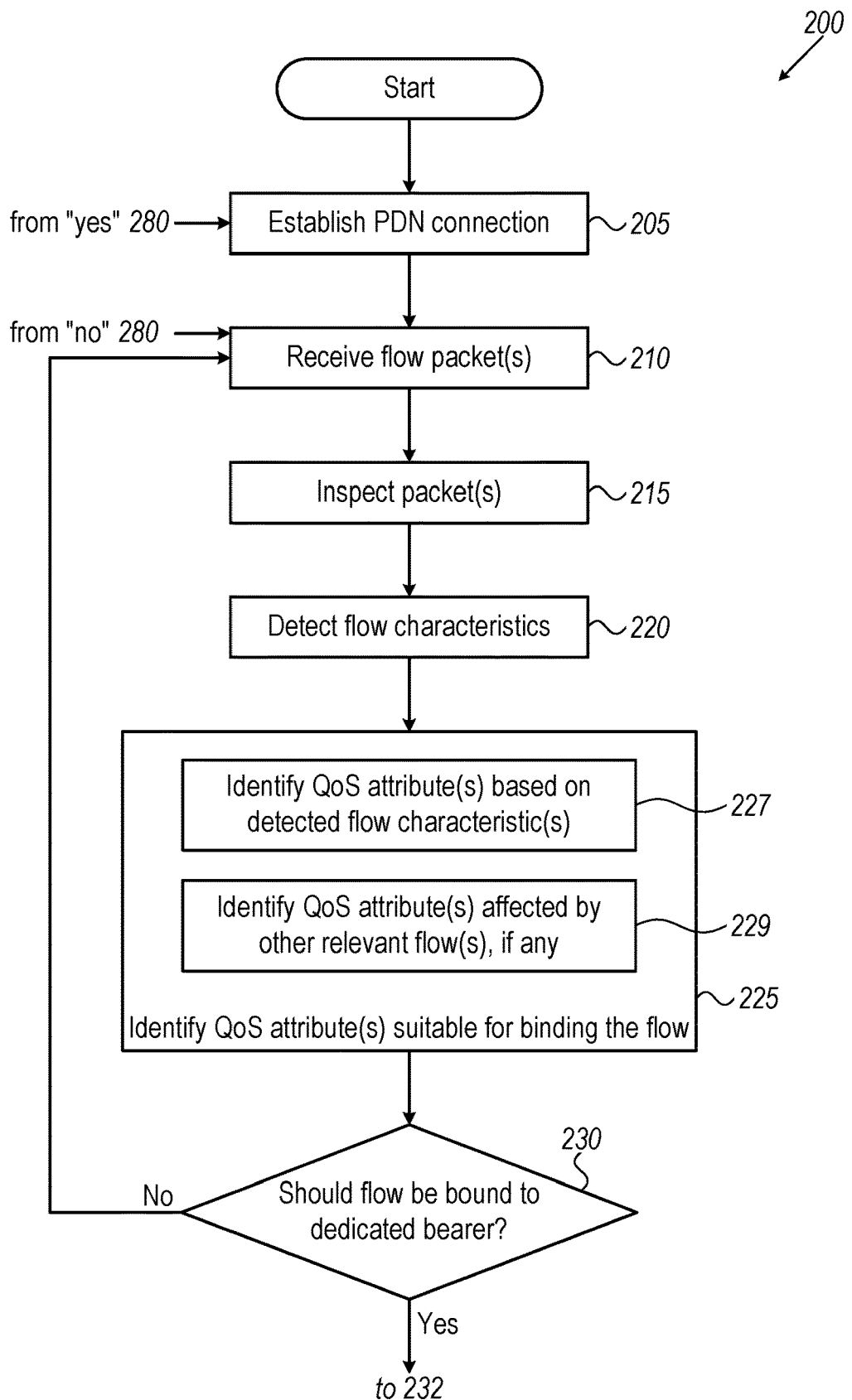
FIG. 2 is a flowchart of a method, in accordance with some embodiments of the presently disclosed subject matter.
Figure 2:
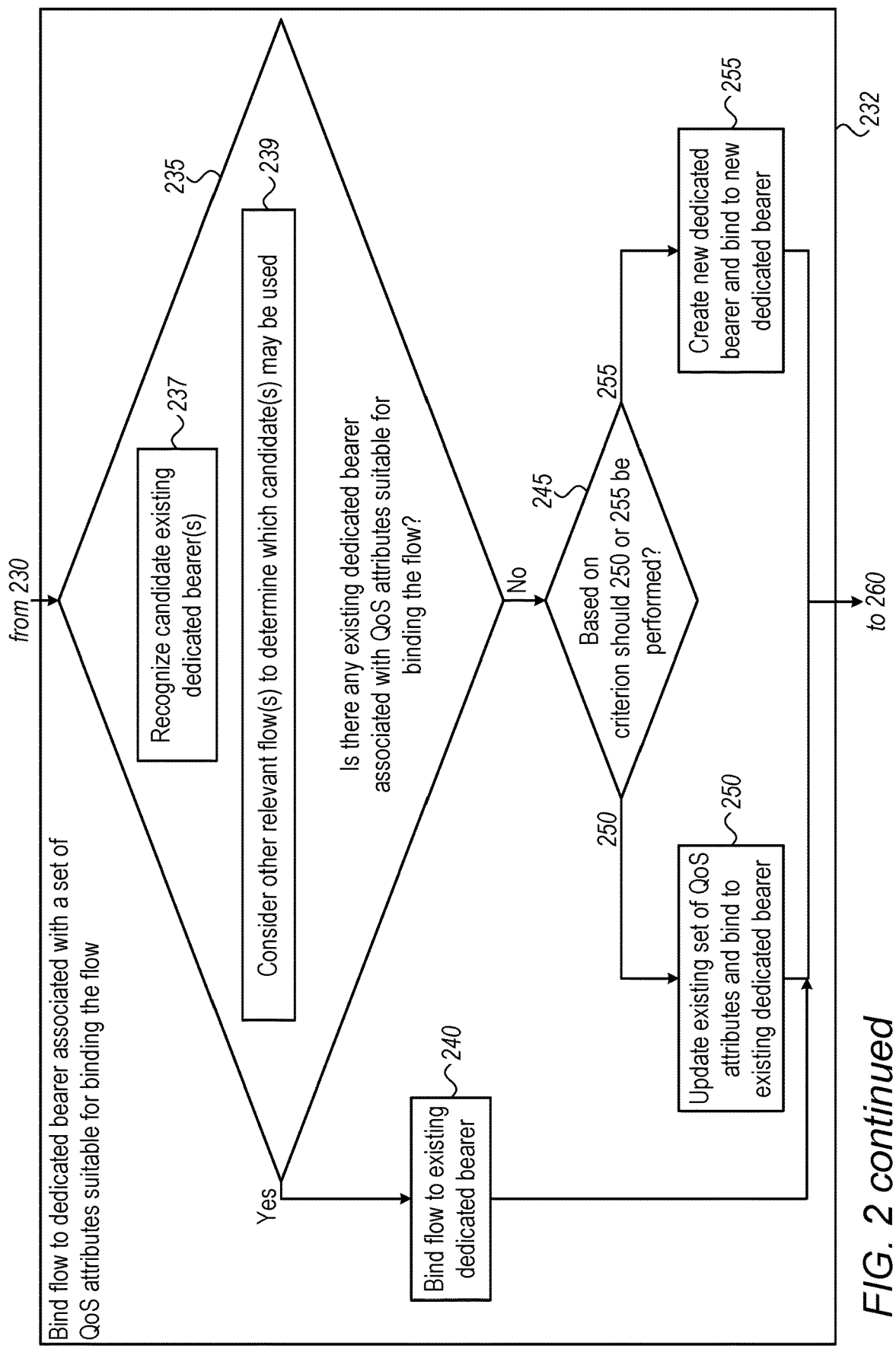
Figure 2:
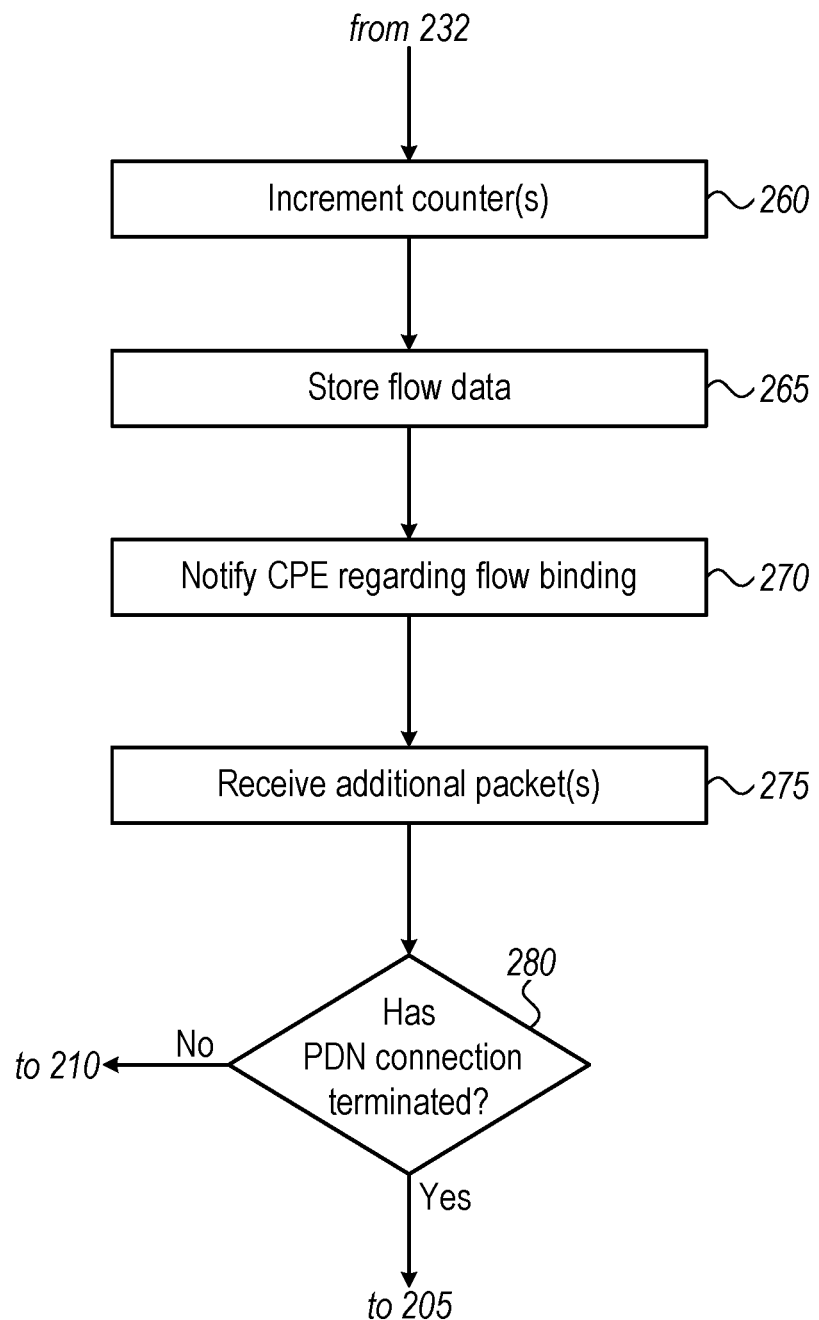

FIG. 2 is a flowchart of a method 200, in accordance with some embodiments of the presently disclosed subject matter. Method 200 will be described with reference to CPE 152, but may be applicable to any CPE of any enterprise network (e.g. of enterprise network 154, 155, 158, 174, 175, 178, etc.)

In stage 205, a PDN connection is established (or in other words IP connectivity is established), and default bearer(s) is created as is known in the art. For example, the establishment and creation may include CPE 152 attaching to mobile network 105, including signaling during which CPE 152 may be authenticated and authorized and an IP address may be assigned; and default bearer(s) being created. For simplicity's sake it is assumed in the description that one default bearer is created. Any flow between CPE 152 and service anchor 115 in packet core 120 will be initially bound to the default bearer.

A bearer may be thought of as a pipe/bucket with defined QoS. Binding a flow to a bearer, or in other words assigning the flow to the bearer, may include applying the QoS attributes associated with the bearer to the flow. If the flow is unbound from the bearer, the flow is no longer assigned to the bearer, and therefore the QoS attributes associated with the bearer are no longer necessarily applicable to the flow.

For each flow of a plurality of flows while the packet data network (PDN) connection remains in place, or in other words during the duration when there is IP connectivity between CPE 152 and mobile network 105, one or more of the remaining stages of method 200 may occur.

In stage 210, service anchor 115 receives one or more packets of a flow associated with an enterprise application executing on CPE 152 or executing on any device 185 behind CPE 152. The flow may be coming from or going to CPE 152. The flow is initially bound to the default bearer.

In stage 215, service anchor 115 inspects one or more packets of the flow. For example, service anchor 115 may detect one or more parameter(s) of a packet by inspecting the packet. The inspection may include, for example, shallow packet inspection, based on Layer 3 detection and/or Layer 4 port detection. Shallow packet inspection may result in port detection for a packet. Shallow packet inspection may be performed, for instance, by any appropriate commercially available traffic analyzer. Additionally or alternatively, the inspection may include deep packet inspection. Deep packet inspection may be performed, for instance, by any appropriate commercially available traffic analyzer. Deep packet inspection may result in detection of the codec, the media etc. For example, deep packet inspection may include a layer 7 analysis which analyzes the properties exchanged between the source and the destination (e.g. the source or the destination being the enterprise application) regarding the codec, the media, the access point name (APN) that identifies a service (e.g. for charging purposes), etc. The analyzed properties may include, for instance, the ports for audio, video, streaming etc.; the codec; the APN, etc. Additionally or alternatively, the inspection may include packet to packet inspection, e.g. when the packet(s) are encrypted. Packet to packet inspection may result in detection of a pattern such as packet size (e.g. voice payload size), bit rate, packet rate, latency, etc. Any appropriate commercially available packet to packet inspection engine may be used. For example, companies such as Cisco®, Allot Communications®, Citrix®, and Ipoque® produce traffic analyzers that may be used for shallow packet inspection, deep packet inspection and/or packet to packet inspection.

In stage 220, service anchor 115 detects one or more characteristics of the flow, based on the inspection of stage 215. For example, the characteristics of the flow may be detected based on the packet parameter(s) determined by the inspection of the packet(s). Flow characteristics may include, for instance, any of:

type of application such as
  audio,
  video,
  gaming (also referred to herein as "interactive gaming"),
  conversational voice (also referred to herein as "voice" e.g. session initiation protocol (SIP) phone, H.323 phone, voice over IP (VOIP), etc.),
  video conferencing (also referred to herein as "live streaming" or "conversational video", e.g. SIP video call),
  video streaming (also referred to herein as "buffered streaming"),
  data (also referred to herein as "Internet" type of application e.g. http/https, ftp, etc.),
  etc.
codec,
application name,
packet size,
latency (also referred to herein as packet delay budget),
packet drop (also referred to herein as packet error loss rate)
prioritization level (e.g. packets from lower priority level flows may be discarded first if there is network congestion)
APN,
bit rate (also referred to herein as "data rate" and related to resolution),
packet rate,
etc.

In some embodiments, an application type may be specified in a more general manner, also referred to herein as flow type (e.g. voice, video, data, audio); and/or may be specified in a more specific manner (such as SIP video call for the flow type of video).

In some embodiments, service anchor 115 may have access to association data which associates certain packet parameter(s) with certain flow characteristic(s). The association data, may be static, or may be dynamic as necessary, as service anchor 115 performs one or more iterations of method 200. For example, new association data may be added, existing association data may be deleted, and/or existing association data may be changed during iterations of method 200. In such embodiments, the detection of characteristic(s) based on the packet parameter(s) by service anchor 115, may include service anchor 115 accessing such association data.

For example, application types may be associated with ports, and therefore if a port is determined by inspection of packet(s) of a flow, characteristic(s) of the flow such the application type may be detected by using the association data. Table 1 illustrates an example of association data relating to certain application types versus ports for such embodiments.

TABLE 1

| Application types | Pattern |
|---|---|
| SIP Phone | Port 5060 |
| H.323 phone | Port 1720 |
| ftp | Standard port |
| http/https | Standard port |

As another example, audio for different codecs, may be associated with a fixed bit rate, a fixed small packet size (e.g. voice payload size) and latency (preferably low for near real time). Therefore, if the codec of packet(s) of the flow is determined by inspection, characteristic(s) of the flow such as application type, bit rate, packet rate (e.g. packets per second), packet size, etc. may be detected by using the association data. Similarly if the fixed packet size and/or fixed bit rate of packet(s) in the flow is determined by inspection, characteristic(s) of the flow such as audio type, bit rate, codec, etc. may be detected by using the association data. Table 2 illustrates an example of association data relating to audio for different codecs versus bit rate, packets per second, and voice payload size, for such embodiments.

TABLE 2

| Codec | Bit rate | Packets per second | Voice payload size (bytes) |
|---|---|---|---|
| G.711 | 64 kbps | 50 | 160 |
| G.729 | 8 kbps | 50 | 20 |
| G.726 | 32 kbps | 50 | 80 |
| G.728 | 16 kbps | 33 | 60 |

As another example, video and video conferencing may be associated with a fixed bit rate and a fixed large packet size. Therefore if the codec, fixed bit rate and/or fixed small packet size of packet(s) in the flow is determined by inspection, then characteristic(s) of the flow such as application type may be detected by using association data. Table 3 illustrates an example of association data relating to video or video conferencing versus bit rate and packet size for such embodiments.

TABLE 3

| Application type | Bit rate | Packet size (bytes) |
|---|---|---|
| Video | 16 kbps | 1316 |
| Video conferencing | 128-324 kbps | 1316 |

As another example, video streaming, and more specifically Youtube™ may be associated with different bit rates for different video resolutions and with a large packet size. Therefore, if the codec, bit rate and/or large packet size is determined by inspection of packet(s) in the flow, then characteristic(s) of the flow such as the application name may be determined by using the association data. Table 4 illustrates an example of association data relating to Youtube versus bit rates for different video resolutions and packet size for such embodiments.

TABLE 4

| Application name | Bit rate | Packet size (bytes) |
|---|---|---|
| Youtube | 400 kbps for 240 p | 1316 |
| Youtube | 750 kbps for 360 p | 1316 |
| Youtube | 1 Mbit/s for 480 p | 1316 |
| Youtube | 2.5 Mbit/s for 720 p | 1316 |
| Youtube | 4.5 Mbit/s for 1080 p | 1316 |

Additionally or alternatively in some embodiments, detected characteristic(s) of the flow may be based on the packet parameter(s) that were determined by inspection, by including one or more of the packet parameter(s) that were determined by inspection.

In stage 225, service anchor 115 identifies one or more quality of service attributes that are suitable for binding the flow. Quality of service attributes may include, for example, guaranteed bit rate (GBR) versus non-guaranteed bit rate (non-GBR); need for dedicated bearer versus no need for a dedicated bearer; allocation and retention priority (ARP); quality of service class identifier (QCI); maximum bit rate (MBR); GBR; APN-AMBR (APN-aggregate maximum bit rate); user equipment aggregated maximum bit rate (UE-AMBR—where a CPE may be an example of a UE; etc. Such QoS attributes may include QoS attribute(s) for a bearer that are suitable for binding the flow, and that ignore any effect from any other flow(s). Such QoS attributes may additionally or alternatively include QoS attributes for a bearer that are suitable for binding the flow, and that may be affected by other relevant flow(s), if any (e.g. may be affected by quantity of flows per bearer, quantity of flows per APN, quantity of flows per CPE, etc.)

For example, stage 225 may include stage 227. In stage 227, service anchor 115 identifies one or more QoS attributes suitable for binding the flow, based on the detected characteristic(s) of the flow. Such QoS attributes typically although not necessarily ignore any effect from any other flow(s).

In some embodiments of stage 227, service anchor 115 may have access to association data which associates certain QoS attribute(s) with certain detected flow characteristic(s). The association data may be static, or may be updated, as necessary, as service anchor 115 performs one or more iterations of method 200. For example, new association data may be added, existing association data may be deleted, and/or existing association data may be changed during iterations of method 200. In such embodiments, the identifying of QoS attributes based on the detected flow characteristic(s) by service anchor 115, may include service anchor 115 accessing such association data.

For example, different APNs may be associated with different ARPs, and therefore service anchor 115 may identify the ARP attribute based on the detected APN of the flow, by using the association data. Table 5 shows an example of association data relating to certain APNs versus ARPs for such embodiments.

TABLE 5

| APN Name | ARP |
|---|---|
| ims.com | 4 |
| internet.com | 5 |
| Emergency.com | 1 |

As another example, different application names and/or different application types (e.g. different flow types and/or different more specific application types) may be associated with different need/no-need for a dedicated bearer attributes and with different QCI attributes. Therefore, service anchor 115 may identify the need/non-need for a dedicated bearer and/or the QCI based on the detected application name and/or application type, by using the association data. Table 6 shows association data relating to the need/non-need for a dedicated bearer and the QCI versus the application name and/or application type for such embodiments.

TABLE 6

| Application Name/ More specific application type | Need Dedicated Bearer | Flow Type | QCI |
|---|---|---|---|
| Skype | Yes | Voice | 1 |
| SIP phone (i.e. voice call) | Yes | Voice | 1 |
| SIP video call | Yes | Video | 2 |
| VOIP | Yes | Voice | 1 |
| H.323 phone | Yes | Voice | 1 |
| Interactive Gaming | Yes | Voice/video | 7 |
| Internet | No (i.e. may use default bearer) | Data | 5 |
| Buffered Streaming | Yes | Video | 6 |

As another example, different packet delay budgets, prioritization levels, packet error loss rates, and/or application types may be associated with GBR/non-GBR and/or different QCIs. Therefore, service anchor 115 may identify the GBR/non-GBR attribute for a bearer, and/or the QCI attribute based on the detected characteristic(s) of packet delay budget, packet error loss rate, prioritization level, and/or application type, by using the association data. Table 7 shows association data relating to the GBR/non-GBR for a bearer, and the QCI versus the packet delay budget in milliseconds (ms), packet error loss rate, prioritization level ("priority) and application type for such embodiments. (It is noted that IMS signaling shown in the table may not necessarily be relevant for enterprise traffic)

TABLE 7

| QCI | GBR/ non-GBR | Priority | Packet delay budget | Packet error loss rate | Example application types |
|---|---|---|---|---|---|
| 1 | GBR | 2 | 100 ms | $10^{-2}$ | Conversational voice |
| 2 | GBR | 4 | 150 ms | $10^{-3}$ | Conversational video (live streaming) |
| 3 | GBR | 3 | 50 ms | $10^{-3}$ | Real time gaming |
| 4 | GBR | 5 | 300 ms | $10^{-6}$ | Non-conversational video (buffered streaming) |

TABLE 7-continued

| QCI | GBR/non-GBR | Priority | Packet delay budget | Packet error loss rate | Example application types |
|---|---|---|---|---|---|
| 5 | Non-GBR | 1 | 100 ms | $10^{-6}$ | IMS signaling |
| 6 | Non-GBR | 6 | 300 ms | $10^{-6}$ | Video (buffered streaming), TCP based (e.g. www, email, chat, ftp, p2p file sharing, progressive video, etc.) |
| 7 | Non-GBR | 7 | 100 ms | $10^{-3}$ | Voice, video (live streaming), interactive gaming |
| 8 | Non-GBR | 8 | 300 ms | $10^{-6}$ | Video (buffered streaming), TCP based (e.g. www, email, chat, ftp, p2p file sharing, progressive video, etc.) |
| 9 | Non-GBR | 9 | 300 ms | $10^{-6}$ | Video (buffered streaming), TCP based (e.g. www, email, chat, ftp, p2p file sharing, progressive video, etc.) |

Below, association data which associates certain packet parameter(s) with certain flow characteristic(s), and/or associates certain QOS attribute(s) with certain flow characteristic(s) is also referred to as "configuration data". For example, Tables 1 to 7 include examples of configuration data.

Stage 225 may additionally or alternatively include, for example, stage 229. In stage 229, service anchor 115 identifies one or more QoS attributes that are suitable for binding the flow, and that may be affected by other relevant flow(s), if any. Stage 229 may be omitted, for instance, if it was determined in stage 227 that no dedicated bearer is required, assuming that an unlimited number of flows may be bound to a single default bearer.

Continuing with describing stage 229, in some embodiments service anchor 115 may have access to association data which associates different QoS attributes with different buckets (e.g. different ranges of quantities of flows). The association data may be static, or may be updated, as necessary, as service anchor 115 performs one or more iterations of method 200. For example, new association data may be added, existing association data may be deleted, and/or existing association data may be changed during iterations of method 200. In such embodiments, service anchor 115 may identify QOS attributes that may be affected by other relevant flow(s), if any, (such as MBR, GBR, APN-AMBR, UE-AMBR, etc.) for a given bucket (i.e. for a given range of quantity/ies of flows) and optionally for other given Qos attribute(s) identified in stage 227 (e.g. QCI, GBR/non-GBR, packet size, etc.), by using the association data.

Table 8 shows association data relating to the buckets (ranges of quantities of flows) and QCIs versus the MBRs and the GBRs for a dedicated bearer having a GBR.

TABLE 8

| Quantity of Flows | QCI | MBR/GBR (mbps) |
|---|---|---|
| 10 (or less) | 1 | 300/200 |
| 11-20 | 1 | 600/400 |
| 21-50 | 1 | 1000/800 |
| 25 (or less) | 2 | 1000/700 |
| 26-50 | 2 | 2000/1400 |

Table 9 shows association data relating to buckets and QCIs versus the APN-AMBRs for bearer(s) not having a GBR, associated with the same APN.

TABLE 9

| Number of flows | QCI | APN-AMBR (mbps) |
|---|---|---|
| 10 or less | 7 | 500 |
| 11-20 | 7 | 800 |
| 21-50 | 7 | 1400 |
| 25 or less | 6 | 400 |
| 25-50 | 6 | 800 |

Below, association data which associates certain QoS attributes with certain buckets is also referred to as "flow bucket data". For example, Tables 8 and 9 include examples of flow bucket data.

In optional stage 230, service anchor 115 determines whether or not the flow should be bound to a dedicated bearer. For example, if QoS attributes (e.g. QCI=5) identified in stage 225 (e.g. more specifically in stage 227) are the attributes of a default bearer, then the binding of the flow to the default bearer may be retained, and the flow need not be bound to a dedicated bearer. Referring to Table 6 presented above, in accordance with Table 6 an Internet data flow may not require a dedicated bearer. If the determination is not to bind the flow to a dedicated bearer, method 200 ends for the current flow. For example, if the PDN connection has not terminated, then after a determination not to bind the flow to a dedicated bearer, method 200 may iterate to stage 210 (as shown in FIG. 2), for another flow going to or coming from CPE 152. Otherwise if the determination is to bind the flow to a dedicated bearer, method 200 proceeds to stage 232.

In some embodiments, stage 230 may be omitted. For example stage 230 may be omitted, if for any appropriate reason it is desirable to bind the flow to a dedicated bearer.

In stage 232, service anchor 115 binds the flow to a dedicated bearer associated with a set of QoS attributes suitable for binding the flow. For example, binding the flow in stage 232 to a dedicated bearer associated with a set of QoS attributes suitable for binding the flow may include any of stages 235 to 255 which will now be described.

In stage 235, service anchor 115 determines if there is any existing dedicated bearer that is associated with QoS attributes suitable for binding the flow. For example, suitable QoS attributes may match the QoS attribute(s) identified in stage 227, and/or may match the QoS attribute(s) identified in stage 229 when directed to current quantity/ies of flows (e.g. per bearer, per APN, per CPE, etc.) plus one additional flow. The existing dedicated bearers may be dedicated bearers created after IP connectivity was established between CPE 152 and mobile network 105. In some embodiments, the term "match" may mean the same or better. In such embodiments, a suitable QoS attribute may be the same as (i.e. representing a similar quality of service) or may be better (i.e. representing a higher quality of service) than a QoS attribute identified in stage 227 or 229. In some other embodiments, the term match may mean the same In the latter embodiments, a suitable QoS attribute may be the same (i.e. representing a similar quality of service) as a QoS attribute identified in stage 227 or 229. The latter embodiments may result in more efficient use of the resources of system 100 than the former embodiments, but may also result in the creation of more dedicated bearers than the former embodiments. It is noted that there may be a limit on the number of bearers that may co-exist, e.g. per PDN connection.

Determining by service anchor 115 in stage 235 may include, for example, stage 237 and/or stage 239.

In stage 237, service anchor 115 recognizes one or more existing dedicated bearers as candidates for binding the flow, ignoring any effect from any other flows. Stage 237 may include recognizing an existing dedicated bearer, associated with one or more QoS attributes which match one or more QoS attributes that were identified for the flow based on the detected characteristic(s) of the flow in stage 227. For example, the QCI, ARP, and/or GBR versus non-GBR may be the same, in order for the existing dedicated bearer to be a candidate for binding the flow.

In stage 239, service anchor 115 determines which, if any, of the candidate existing dedicated bearers may be used for binding the flow, once other relevant flow(s) are considered. For example, stage 239 may include analyzing for the candidate existing dedicated bearer(s) recognized in stage 237, total quantity/ies of flows that would exist (e.g. per bearer, APN, CPE, etc.) if the current flow were to be bound to the candidate existing dedicated bearer (or equivalently, analyzing current quantity/ies of flows now existing per bearer, APN, CPE etc., plus one added to each current quantity); and comparing the QoS attribute(s) that may be affected by other relevant flow(s), if any, and that are associated with the candidate(s), to the QoS attribute(s) identified in stage 229.

For example, the MBR/GBR shown in the first three rows of table 8 may have been identified in stage 229. Candidate existing dedicated bearer(s) associated with a QCI of 1 and a guaranteed bit rate may have been recognized in stage 237. For any candidate existing dedicated bearer, the actual MBR/GBR associated with the candidate existing dedicated bearer may be compared to the identified MBR/GBR corresponding to the current quantity of flows bound to the candidate existing dedicated bearer plus one, in order to determine if the flow may be bound to the candidate existing dedicated bearer. If the actual MBR/GBR is equal to or greater than (or in other examples if the actual MBR/GBR is equal to) the identified MBR/GBR, the flow may be bound to the candidate existing dedicated bearer. Similarly, if the current quantity of flows plus one is less than or equal to the highest value of the current bucket for the candidate existing dedicated bearer (or in other examples, less than or equal to the highest value of the current bucket, but greater than the lowest value of the current bucket), then the flow may be bound to the candidate existing dedicated bearer.

As another example, the APN-AMBR shown in the last two rows of Table 9 may have been identified in stage 229. Candidate existing dedicated bearer(s) associated with a QCI of 6 and no guaranteed bit rate may have been recognized in stage 237. For any candidate existing dedicated bearer, the actual APN-AMBR associated with the relevant bearer(s), including being associated with the candidate existing dedicated bearer, may be compared to the identified APN-AMBR corresponding to the current quantity of flows bound to the relevant bearer(s) plus one. If the actual APN-AMBR is equal to or greater than (or in other examples if the actual APN-AMBR is equal to) the identified APN-AMBR, the flow may be bound to the candidate existing dedicated bearer. Similarly, if the current quantity of flows bound to the relevant bearer(s) plus one is less than or equal to the highest value of the current bucket for the relevant bearer(s) (or in other examples, less than or equal to the highest value of the current bucket, but greater than the lowest value of the current bucket), then the flow may be bound to the candidate existing dedicated bearer.

If it is determined in stage 235 that there is any existing dedicated bearer associated with QoS attributes suitable for binding the flow, then in stage 240, service anchor 115 binds the flow to an existing dedicated bearer associated with a set of QoS attributes suitable for binding the flow. If there is more than one existing dedicated bearer associated QOS attributes suitable for binding the flow, then service anchor 115 may bind the flow to one of such existing dedicated bearer(s), the one being associated with the set of QoS attributes suitable for binding the flow. The one may be selected arbitrarily or in accordance with any appropriate selection algorithm (e.g. for a plurality of GBR existing dedicated bearers, select the existing dedicated bearer having the largest gap between the highest value of the current bucket for the existing dedicated bearer, and the current quantity of flows bound to the existing dedicated bearer plus one). Method 200 may then skip to stage 260 for the current flow.

Alternatively, if it is determined in stage 235 that there is no existing dedicated bearer associated with QoS attributes suitable for binding the flow, then in stage 245, service anchor 115 determines whether to perform stage 250 or to perform stage 255, depending on at least one criterion. For example, the at least one criterion may include, whether or not updating of QoS attributes is allowed. As another example, the at least one criterion may include, whether or not creation of a new dedicated bearer is allowed. As another example, the at least one criterion may include whether or not any existing dedicated bearer is associated with suitable QoS attribute(s) that are not affected by any other flow(s). As another example, the at least one criterion may include whether or not any existing dedicated bearer is associated with QoS attributes that may be affected by other relevant flow(s), if any, and that are at predetermined value(s) (e.g. maximum value(s)) for such QoS attributes.

Implementation of such criterion/criteria may allow any suitable selection of stage 250 or 255. For instance, if updating is not allowed then stage 255 may be performed. In another instance, if no candidate existing dedicated bearer was determined in stage 237 (e.g. there is no existing dedicated bearer associated with suitable QoS attribute(s) that are not affected by any other flow(s)), then stage 255 may be performed. Continuing with describing such an instance, no candidate existing dedicated bearer may have been determined if the GBR/non-GBR, QCI and/or ARP attributes associated with any existing dedicated bearer do not match the GBR/non-GBR, QCI and/or ARP attributes identified in stage 227 for the flow. In another instance, existing candidate dedicated bearer(s) may have been determined in stage 237, but QoS attribute(s) affected by other relevant flow(s), if any, may not be updatable. Continuing with describing such an instance, if the MBR,GBR, APN-AMBR and/or UE-AMBR attribute(s) associated with an existing candidate dedicated bearer is at the predetermined (e.g. maximum) value(s) (e.g. because the associated MBR, GBR, APN-AMBR and/or UE-AMBR correspond to the highest level bucket for a QCI associated with the existing candidate dedicated bearer) but is insufficient for the binding of the current flow to the candidate existing dedicated bearer (e.g. because the current quantity of flows equals the highest value of the bucket), then stage 255 may be performed. In another instance, if updating is allowed, candidate existing dedicated bearer(s) were determined, and QoS attribute(s) affected by other relevant flow(s), if any, are not at predetermined (e.g. maximum) value(s), then stage 250 may be performed. Additionally or alternatively, if creation is not allowed, e.g. due to a limit on the number of bearers, then stage 250 may be performed.

In stage 250, service anchor 115 updates an existing set of QoS attributes associated with one of the existing dedicated bearer(s) (e.g. as determined in stages 237 and 239) and binds the flow to the existing dedicated bearer associated with the updated set of QoS attributes. The updating of the existing set of QoS attributes may update one or more QoS attributes in the set. Typically although not necessarily, the QoS attribute(s) that are updated, include attribute(s) that may be affected by other relevant flow(s), if any. Such attribute(s) may be updated so as to be suitable for the next higher level(s) of bucket(s). The next higher level(s) of bucket(s) may be determined from association data (e.g. more specifically from flow bucket data included in association data). For example, the MBR, GBR, APN-AMBR and/or UE-AMBR attribute(s) may be updated so as to correspond to the next higher level(s) of bucket(s) for quantity/ies of flows. An updating and more specifically an increase of the MBR and/or GBR for an existing dedicated bearer having a GBR, for instance, may allow a quantity of flows within the next higher level bucket to be bound to the existing dedicated bearer. For example if the current bucket is shown in the first column of the second to last row of Table 8, the next higher level bucket may be as shown in the first column of the last row of Table 8. An updating and more specifically an increase of the APN-AMBR and/or UE-AMBR associated with relevant bearer(s), including being associated with an existing dedicated bearer which does not have a GBR may allow quantity/ies of flows corresponding to next higher level bucket(s) to exist per APN and/or CPE (including allowing the current flow to be bound in stage 250 to the existing dedicated bearer). For example, if the current bucket is shown in the first column of the second to last row of Table 9, the next higher level bucket may be as shown in the first column of the last row of Table 9.

In stage 255, a new dedicated bearer is created. The new dedicated bearer is associated with a new set of QoS attributes that is suitable for binding the flow. The new set of QoS attribute(s) may be suitable for binding the flow by including in the new set Qos attribute(s) not affected by any other flow(s) that match the QoS attribute(s) identified in stage 227 for the flow based on the detected characteristic(s) of the flow. Additionally or alternatively, the new set of QoS attribute(s) may be suitable for binding the flow by including QoS attribute(s) that may be affected by other relevant flow(s), if any, and which are suitable at least for the quantity/ies of flows (e.g. suitable at least for one flow) resulting from the binding of the current flow to the new dedicated bearer. For example, suitable QoS attribute(s) in the new set that may be affected by other relevant flow(s), if any, may correspond to the lowest level bucket(s). The lowest level bucket(s) may be determined from association data (e.g. more specifically from flow bucket data included in the association data). Referring for instance to Tables 8 and 9, the lowest level buckets for QCI of 2 and 6 respectively are shown in the first column of the second to last row.

An updated set of QoS attributes associated with an existing dedicated bearer, or a new set of QoS attributes associated with a new dedicated bearer, may be suitable for the binding of the current flow. Optionally the updated set or new set may also be suitable for the binding of additional flows in the future, if occurring. An additional flow in the future, or in other words a future flow, refers to a flow which begins to be received (or in other words the first packet is received) after the updating of the set of QoS attributes, or after the creation of the new set of QoS attributes as part of the creation of the new dedicated bearer. For example, QoS attribute(s) may be updated, or new QoS attribute(s) may be created, so as to be suitable for a quantity of flows increased by one from a previous quantity (e.g. where the increase of one is for the current flow), or so as to be suitable for a quantity of flows increased by one, two and possibly more from a previous quantity (where an increase of two or more includes the current flow and one or more additional flows in the future). In an embodiment where the updating to the set of QoS attribute(s) or the creating of a new set of QoS attribute(s) is suitable for an increase of one flow from a previous quantity, the bucket corresponding to the updated set of QoS attribute(s), or to the new set of QoS attribute(s) may include a range of one quantity of flows. In an embodiment where the updating of the set or creating of the new set is also suitable for the binding of additional flows in the future, if occurring, the flows may be considered to be handled on an aggregated flow basis. In the latter embodiments, the bucket corresponding to the updated set of QoS attribute(s), or to the new set of QoS attribute(s) may include a range of ten quantities of flows (or any other range such as 2, 5, 8, 15, 20, 25, etc. of quantities of flows). In such embodiments, the updating and/or creating of QoS attributes, may relate to a group of flows (or in other words aggregated flows), rather than just to the current flow.

In optional stage 260, service anchor 115 may increment counter(s) for quantity/ies of flows (e.g. per bearer, per APN, per CPE, etc.), as a result of the binding of the flow in stage 232 (e.g. more specifically as a result of the binding in 240, 250 or 255).

In optional stage 265, service anchor 115 may store data (e.g. in memory) relating to the binding of the flow in stage 232 (e.g. more specifically relating to the binding in stage 240, 250 or 255). Any appropriate data may be stored such as: a dedicated bearer identifier for a new dedicated bearer; the QoS attributes associated with the dedicated bearer (e.g. new or updated QoS attributes); identifier (e.g. assigned service data flow (SDF), 5-tuple, etc.) of the flow currently bound to the dedicated bearer; current quantity/ies of flows (e.g. per bearer, per APN, per CPE, etc.); current bucket(s) resulting from updating of QoS attributes or creation of new QoS attributes (e.g. next higher level bucket(s) resulting from updated or created MBR/GBR, APN-AMBR, UE-AMBR, etc.), etc. Such data may be examples of stored "flow data", where flow data may be any appropriate data relating to flow(s) and/or bearer(s). The storing may include, adding new data, deleting previously stored data, and/or changing previously stored data. It is noted that flow data may be stored in any appropriate form, such as bucket size of current bucket being stored as an indication of the current bucket. In some embodiments, stage 260 may be performed as part of stage 265; or stage 260 and/or stage 265 may be performed as part of stage 232 (e.g. more specifically as part of stage 240, 250 or 255).

In stage 270, service anchor 115 notifies the CPE (e.g. CPE 152) of the binding of the flow to a dedicated bearer. For example, if the flow was bound to an existing dedicated bearer in stage 245, then service anchor 115 may notify the CPE of the association of an identifier (e.g. SDF, 5-tuple, etc.) of the flow with an identifier of the existing dedicated bearer. As another example, if the flow was bound to an existing dedicated bearer associated with an updated set of QoS attributes, then service anchor 115 may notify the CPE of the association of an identifier of the flow (e.g. SDF) with an identifier of the existing dedicated bearer, and of any updated QoS attributes. As another example, if the flow was bound to a new dedicated bearer, then service anchor 115 may notify the CPE of the association of an identifier of the flow (e.g. SDF) with an identifier of the new dedicated bearer, and of the new set of QoS attributes associated with the new dedicated bearer. As another example, service anchor 115 may notify the CPE of any other flow data, e.g. quantity/ies of flows, current bucket(s) (e.g. bucket size of current bucket(s)), QOS attributes associated with the dedicated bearer that have not changed, etc.

In optional stage 275, service anchor 115 receives additional packet(s) of the flow that was bound to the dedicated bearer in stage 232. Stage 275 may be performed for as many packet(s) of the flow as received.

In some embodiments, one or more stages of method 200 may be performed a plurality of times for a given flow. For example, any of stages 232 to 270 may be performed a plurality of times for a flow, e.g. if the flow is coming from a CPE (e.g. 156) and is going to other CPE(s) (e.g. 152) in system 100. Additionally or alternatively, stage 210 and/or 275 may be performed a plurality of times for the flow. For instance, if a flow is coming from a CPE (e.g. 156) and is going to other CPE(s) (e.g. 152) in system 100, packet(s) of the flow may be received at service anchor 115 before being routed by private network core 120, and after being routed by private network core 120.

In stage 280 it is determined whether or not the PDN connection has terminated (i.e. whether or not IP connectivity has terminated between the CPE—e.g. CPE 152—and mobile network 105). If yes, then method 200 may iterate to stage 205 for another PDN connection with the same or different CPE. Optionally, prior to iterating to stage 205, bearer(s) (default and/or dedicated) that were established during the PDN connection and that have not been previously deleted are deleted, e.g. by deleting from memory, flow data relating to the bearers.

If it is instead determined in stage 280 that the PDN connection has not terminated, then method 200 may iterate to stage 210 for another flow going to or coming from CPE 152. The other flow may be associated with the same device (e.g. CPE 152 or the same device 185 behind CPE 152) as the flow in the current iteration, or may be associated with a different device. For instance, the other flow may be associated with an enterprise application executing on the CPE (e.g. CPE 152) or on any device behind the CPE (e.g. any device 185 behind CPE 152). It is noted that iterations of any of stages 210 to 280 for different flows during the PDN connection may additionally or alternatively be performed in parallel. It is further noted that stages 210 to 280 may not necessarily be performed for all flows during the PDN connection. For instance, one or more flows may instead be bound to the default bearer and remain bound to the default bearer.

Although for simplicity's sake method 200 was discussed above with reference to a single PDN connection for the CPE (e.g. CPE 152) during a duration in which there is IP connectivity between the CPE and mobile network 105; in some embodiments there may be a plurality of PDN connections for the CPE during a duration in which there is IP connectivity between the CPE and mobile network 105. In such embodiments, service anchor 115 may perform method 200 with respect to the plurality of PDN connections for the CPE. For example, service anchor 115 may perform iterations of method 200 in parallel for those of the plurality of PDN connections which are active in parallel, and/or sequentially. In such embodiments, IP connectivity may commence, for instance, upon the establishment of the first active PDN connection among the plurality of PDN connections, and cease, for instance, upon termination of the last active PDN connection among the PDN connections.

Method 200 may be additionally or alternatively be performed for other CPE(s) in system 100, sequentially and/or in parallel with performance for CPE 152. In some cases, an iteration of one or more stages of method 200 may be applicable to more than one CPE. For example, if a flow is coming from a CPE (e.g. 156) and is going to other CPE(s) (e.g. 152) in system 100, one iteration of one or more of stage(s) 215 to 230 that is performed for the flow may be applicable for more than one CPE (e.g. CPEs 152 and 156).

Data flow diagrams 3, 4, and 5 will now be described, in order to further illustrate examples of method 200.

Figure 3:
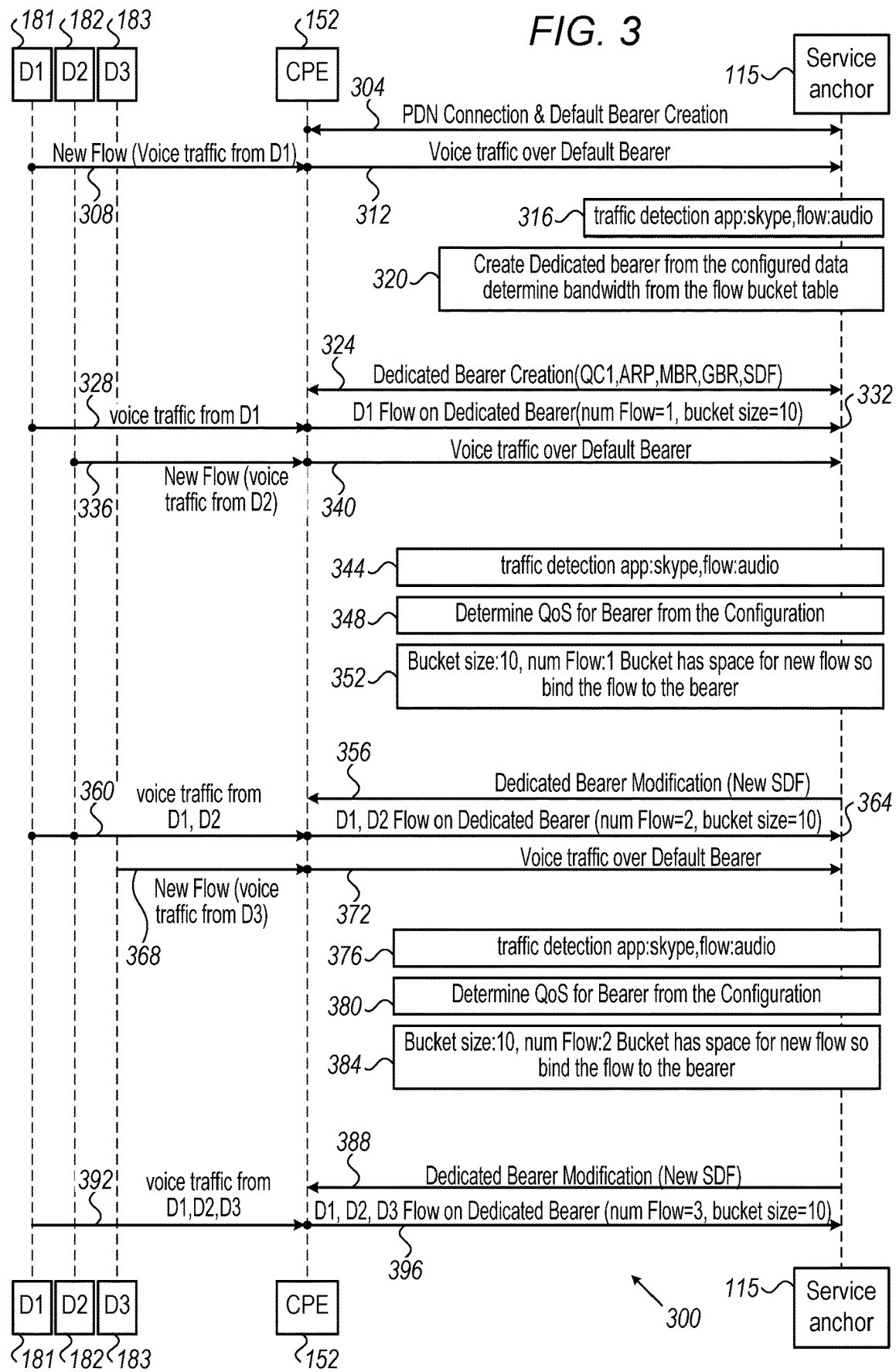
FIG. 3 is a data flow diagram, in accordance with some embodiments of the presently disclosed subject matter.

FIG. 3 is a data flow diagram 300, in accordance with some embodiments of the presently disclosed subject matter.

FIG. 3 refers to three devices D1 181, D2 182, and D3 183 behind CPE 152. FIG. 3 also refers to CPE 152, and service anchor 115.

Stage 304 includes the establishing of a PDN connection for CPE and the creating of a default bearer for communication with service anchor 115. Stage 304 may be an example of stage 205 of FIG. 2 (mutatis mutandis all other refs. to FIG. 2).

In stage 308, packets of a first flow, assumed to be voice traffic, are sent by D1 181 to CPE 152. In stage 312, CPE 152 sends packets of the voice traffic over the default bearer to service anchor 115. The receiving by service anchor 115 of one or more packets of the first flow may be an example of stage 210 of method 200.

In stage 316, service anchor 115 detects that the traffic relates to a Skype application (i.e. the application name is Skype) and the type of flow is audio. Stage 316 may be an example of stages 215 and 220 of method 200.

In stage 320, service anchor 115 creates a new dedicated bearer. The dedicated bearer is associated with QoS attributes suitable for binding the first flow. QoS attributes may have been identified using configuration data and flow bucket data. Stage 320 may be an example of stage 255 and optionally inherently of one or more other appropriate stages of method 200.

In stage 324, service anchor 115 notifies CPE 152 that the first flow (referred to in the figure as a service data flow SDF) is bound to a new created dedicated bearer associated with a particular QCI, ARP, MBR, and GBR. Stage 324 may be an example of stage 270 of method 200.

In stage 328, more packet(s) of the first flow of voice traffic are sent from D1 181 to CPE 152. In stage 332, such packet(s) of the first flow are sent over the dedicated bearer from CPE 152 to service anchor 115. The receipt of the packet(s) by service anchor 115 may be an example of stage 275 of method 200. Stages 328 and 332 may be repeated as more packet(s) are sent.

In stage 336, packet(s) of a second flow of voice traffic is sent by D2 182 to CPE 152. In stage 340 CPE 152 sends packet(s) of the second flow over a default bearer to service anchor 115. The receipt of such packet(s) by service anchor 115 may be an example of stage 210 (e.g. in another iteration of method 200).

In stage 344, service anchor 115 detects that the traffic relates to a Skype application and the type of flow is audio. Stage 316 may be an example of stages 215 and 220 (e.g. in the other iteration of method 200).

In stage 348, service anchor 115 determines the QoS attributes that would be suitable for binding the second flow, using configuration data. Stage 348 may be an example of stage 227 (e.g. in the other iteration of method 200).

In stage 352, service anchor 115 determines that the quantity of flows already bound to the dedicated bearer (e.g. one flow) is less than the highest value of the current bucket (e.g. 10) and therefore the bucket has space for the second flow. The highest value of the bucket is also referred to herein as bucket size. Service anchor 115 therefore binds the flow to the dedicated bearer that was created in stage 320. Stage 352 may be an example of stages 239 and 240 and optionally inherently of other appropriate stage(s) (e.g. in the other iteration of method 200).

In stage 356, service anchor 115 notifies CPE 152 that the second flow (e.g. second SDF) is bound to the dedicated bearer. Stage 356 may be an example of stage 270 (e.g. in the other iteration of method 200).

In stage 360, D1 181 and D2 182 send more packet(s) of the flows to CPE 152. In stage 364, packet(s) of the flows from D1 181 and D2 182 are sent by CPE 152 to service anchor 115 over the dedicated bearer. The receipt of the packet(s) by service anchor 115 may be an example of iteration(s) of stage 275 of method 200. Stages 360 and 364 may be repeated as more packet(s) are sent.

In stage 368, packet(s) of a third flow of voice traffic is sent by D3 183 to CPE 152. In stage 372, CPE 152 sends packet(s) of the third flow over a default bearer to service anchor 115. The receipt of such packet(s) by service anchor 115 may be an example of stage 210 (e.g. in an additional iteration of method 200).

In stage 376, service anchor 115 detects that the third traffic flow relates to a Skype application and the type of flow is audio. Stage 316 may be an example of stages 215 and 220 (e.g. in the additional iteration of method 200).

In stage 380, service anchor 115 determines the QoS attributes that would be suitable for binding the third flow, using configuration data. For example, stage 380 may be an example of stage 227 (e.g. in the additional iteration of method 200).

In stage 384, service anchor 115 determines that the number of flows already bound to the dedicated bearer (e.g. two flows) is less than the bucket size (e.g. 10) and therefore the bucket has space for the third flow. Service anchor 115 therefore binds the third flow to the dedicated bearer created in stage 320. Stage 384 may be an example of stages 239 and 240 and optionally inherently of other appropriate stage(s) (e.g. in the additional iteration of method 200).

In stage 388, service anchor 115 notifies CPE 152 that the third flow (e.g. third SDF) is bound to the dedicated bearer. Stage 356 may be an example of stage 270 (e.g. in the additional iteration of method 200).

In stage 392, D1 181, D2 182, and D3 183 send more packet(s) of the flows to CPE 152. In stage 396, packet(s) of the flows from D1 181, D2 182, and D3 are sent by CPE 152 to service anchor 115 over the dedicated bearer. The receipt of the packet(s) by service anchor 115 may be an example of iteration(s) of stage 275 of method 200. Stages 392 and 396 may be repeated as more packet(s) are sent.

Figure 4:
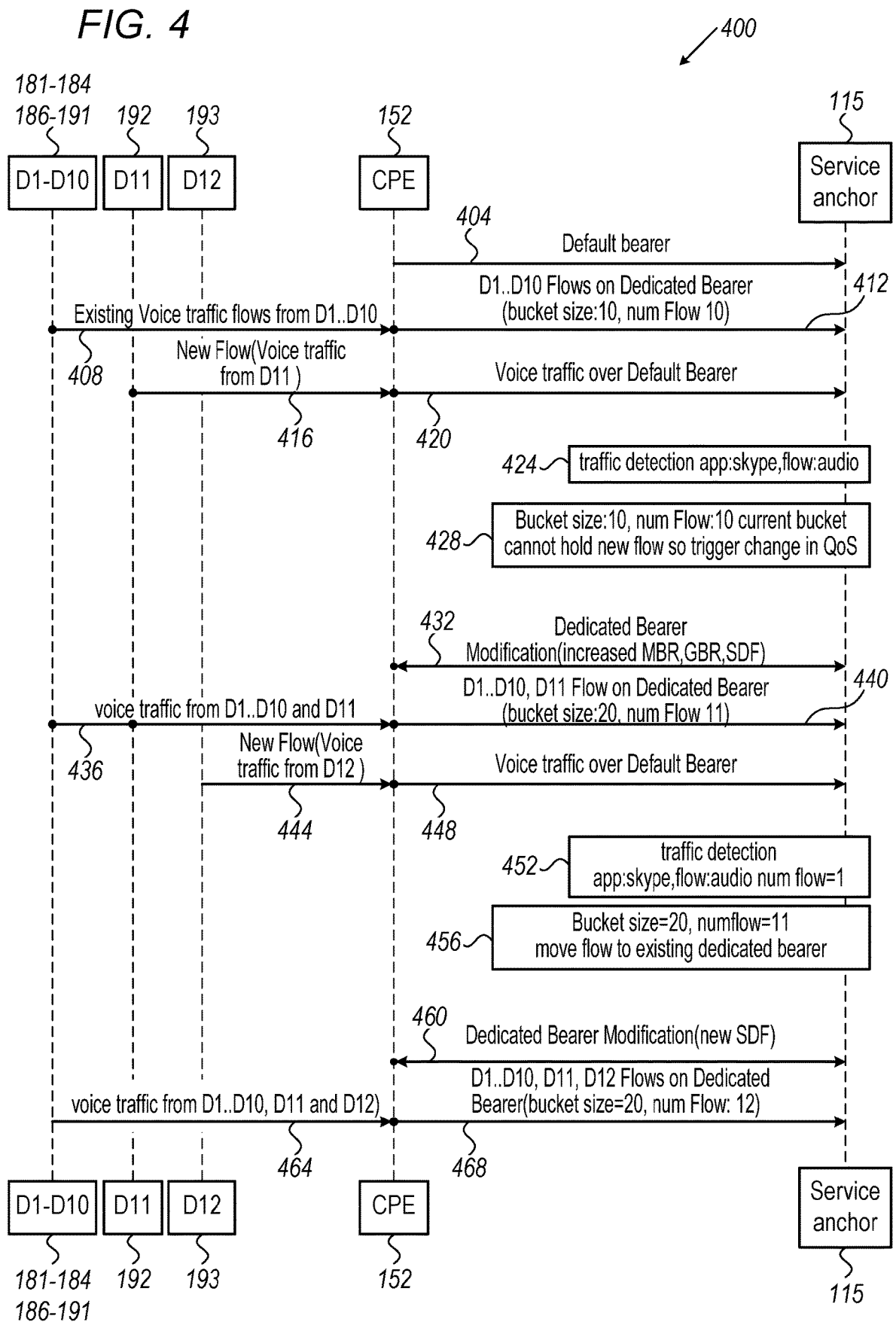
FIG. 4 is another data flow diagram, in accordance with some embodiments of the presently disclosed subject matter.

FIG. 4 is a data flow diagram 400, in accordance with some embodiments of the presently disclosed subject matter.

Devices 181, 182, 183, 184, 186, 187, 188, 189, 190, 191, 192 and 193 behind CPE 152, CPE 152 and service anchor 115 are referred to in FIG. 4.

In stage 404, a default bearer is created. Stage 404 is an example of stage 205 of FIG. 2 (mutatis mutandis all other refs. to FIG. 2).

In stage 408, existing voice traffic flows are sent by D1-D10 (181, 182, 183, 184, 186, 187, 188, 189, 190, and 191) to CPE 152. In stage 412, CPE 152 sends the traffic flows to service anchor 115 over a dedicated bearer associated with a bucket size of 10, the dedicated bearer having ten flows bound to the dedicated bearer. For example, such a dedicated bearer may have been created and flows may have been bound to such a dedicated bearer as described above with reference to data flow diagram 300. The receipt of packets of such voice traffic flows may be an example of iteration(s) of stage 275 of method 200.

In stage 416, device D11 192 sends packet(s) of an eleventh flow to CPE 152. In stage 420, CPE 152 sends packet(s) of the eleventh flow over the default bearer to service anchor 115. The receipt of such packet(s) may be an example of stage 210.

In stage 424, service anchor 115 detects that the eleventh flow relates to a Skype application and the type of flow is audio. Stage 424 may be an example of stages 215 and 220.

In stage 428, service anchor 115 determines that the quantity of flows (e.g. ten flows) already bound to the dedicated bearer is equal to the bucket size (e.g. 10) and therefore the bucket has no space for the eleventh flow. Service anchor 115 therefore updates the set of QoS attributes (e.g. increases MBR and GBR in the set for an increased bucket size of 20) for the dedicated bearer. Service anchor 115 then binds the eleventh flow to the dedicated bearer. Stage 428 may be an example of stages 239 and 250 and optionally inherently of other appropriate stage(s) of method 200.

In stage 432, service anchor 115 notifies CPE 152 that the eleventh flow from device D11 192 is bound to the dedicated bearer and that the dedicated bearer is associated with an increased MBR and GBR. Stage 432 may be an example of stage 270 of method 200.

In stage 436, D1-D11 181, 182, 183, 184, 186, 187, 188, 189, 190, 191, and 192 send more packet(s) of the flows to CPE 152. In stage 440, packet(s) of the flows are sent by CPE 152 to service anchor 115 over the dedicated bearer associated with the now increased MBR and GBR, and therefore with the larger bucket size. The receipt of the packet(s) by service anchor 115 may be an example of iteration(s) of stage 275 of method 200. Stages 436 and 440 may be repeated as more packet(s) are sent.

In stage 444, device D12 193 sends packet(s) of a twelfth flow to CPE 152. In stage 448, CPE 152 sends packet(s) of the twelfth flow over the default bearer to service anchor 115. The receipt of such packet(s) may be an example of stage 210 (e.g. in an additional iteration of method 200).

In stage 452, service anchor 115 detects that the twelfth flow relates to a Skype application and the type of flow is audio. Stage 452 may be an example of stages 215 and 220 (e.g. in the additional iteration of method 200).

In stage 456, service anchor 115 determines that the quantity of flows (e.g. eleven flows) already bound to the dedicated bearer is less than the bucket size (e.g. 20) and therefore the bucket has space for the twelfth flow. Service anchor 115 therefore binds the twelfth flow to the dedicated bearer. Stage 456 may be an example of stages 239 and 240 and optionally inherently of other stage(s) (e.g. in the additional iteration of method 200).

In stage 464, D1-D12 181, 182, 183, 184, 186, 187, 188, 189, 190, 191, 192, and 193 send more packet(s) of the flows to CPE 152. In stage 468, packet(s) of the flows are sent by CPE 152 to service anchor 115 over the dedicated bearer. The receipt of the packet(s) by service anchor 115 may be an example of iteration(s) of stage 275 of method 200. Stages 464 and 468 may be repeated as more packet(s) are sent.

Figure 5:
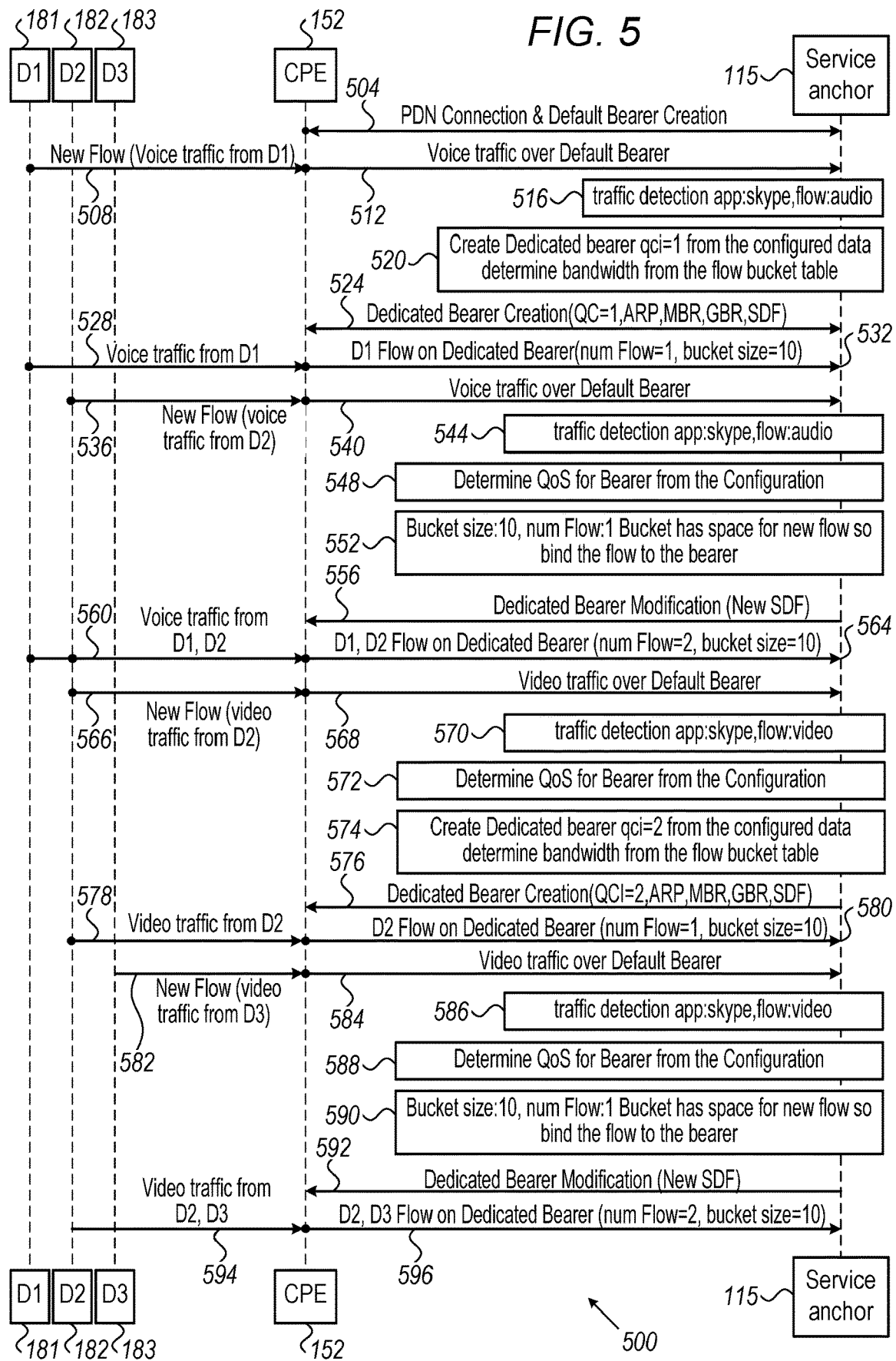
FIG. 5 is yet another data flow diagram, in accordance with some embodiments of the presently disclosed subject matter.

FIG. 5 is a data flow diagram 500, in accordance with some embodiments of the presently disclosed subject matter.

FIG. 5 refers to three devices D1 181, D2 182, and D3 183 behind CPE 152. FIG. 5 also refers to CPE 152, and service anchor 115.

Stages 504 to 564 correspond to stages 304 to 364 of FIG. 3, and therefore reference is made to the description of FIG. 3 for stages 304 to 364. It is assumed that the dedicated bearer is characterized by a QCI of 1.

In stage 566, D2 182 sends packet(s) of a flow for video traffic to CPE 152. In stage 568, CPE 152 send the packet(s) over a default bearer to service anchor 115. The receiving by service anchor 115 of one or more packets of the flow may be an example of stage 205 of method 200 of FIG. 2 (mutatis mutandis all other refs. to FIG. 2).

In stage 570, service anchor 115 detects that the traffic flow relates to a Skype application (i.e. the application name is Skye) and the type of flow is video. Stage 570 may be an example of stages 215 and 220 of method 200.

In stage 572, service anchor 115 determines the QoS attributes that would be suitable for binding the flow, using configuration data. For example, stage 572 may be an example of stage 227 of method 200. One of the QoS attributes that may be determined may be a QCI of 2.

In stage 574, service anchor 115 creates a new dedicated bearer. The new set of QoS attributes associated with the new dedicated bearer may include a QCI of 2 and a particular ARP, identified using configuration data. The bandwidth (e.g. the MBR and GBR) associated with the dedicated bearer may correspond to the lowest level bucket (e.g. with a bucket size of 10), identified from the flow bucket data. Service anchor 115 binds the flow to the new dedicated bearer. Stage 574 may be an example of stage 255 and optionally inherently of other appropriate stage(s) of method 200.

In stage 576, service anchor 115 notifies CPE 152 that the flow (referred to in the figure as a service data flow SDF) is bound to a new dedicated bearer associated with a QCI of 2, and with particular ARP, MBR, and GBR attributes. Stage 576 may be an example of stage 270 of method 200.

In stage 578, more packet(s) of the flow of video traffic are sent from D2 182 to CPE 152. In stage 580, such packet(s) of the flow are sent over the dedicated bearer from CPE 152 to service anchor 115. The receipt of the packet(s) by service anchor 115 may be an example of iteration(s) of stage 275 of method 200. Stages 578 and 580 may be repeated as more packet(s) are sent.

In stage 582, packet(s) of a second flow of video traffic is sent by D3 183 to CPE 152. In stage 584, CPE 152 sends packet(s) of the second flow over a default bearer to service anchor 115. The receipt of such packet(s) by service anchor 115 may be an example of stage 210 (e.g. in a further iteration of method 200).

In stage 586, service anchor 115 detects that the second flow of video traffic relates to a Skype application and the type of flow is video. Stage 586 may be an example of stages 215 and 220 (e.g. in the further iteration of method 200).

In stage 588, service anchor 115 determines the QoS attributes that would be suitable for binding the second flow of video traffic, using configuration data. One of the QoS attributes that may be determined may be a QCI of 2. For example, stage 588 may be an example of stage 227 (e.g. in the further iteration of method 200).

In stage 590, service anchor 115 determines that the quantity of flows (e.g. one flow) already bound to the dedicated bearer created in stage 574 is less than the bucket size (e.g. 10) and therefore the bucket has space for the second flow of video traffic. Service anchor 115 therefore binds the second flow of video traffic to the dedicated bearer created in stage 574. Stage 590 may be an example of stages 239 and 240 and optionally inherently of other appropriate stage(s) (e.g. in the further iteration of method 200).

In stage 592, service anchor 115 notifies CPE 152 that the second flow of video traffic (e.g. second SDF) is bound to the dedicated bearer. Stage 592 may be an example of stage 270 (e.g. in the further iteration of method 200).

In stage 594, D2 182 and D3 183 send more packet(s) of the flows to CPE 152. In stage 596, packet(s) of the flows from D2 182 and D3 183 are sent by CPE 152 to service anchor 115 over the dedicated bearer. The receipt of the packet(s) by service anchor 115 may be an example of iteration(s) of stage 275 of method 200. Stages 594 and 596 may be repeated as more packet(s) are sent.

Figure 6:
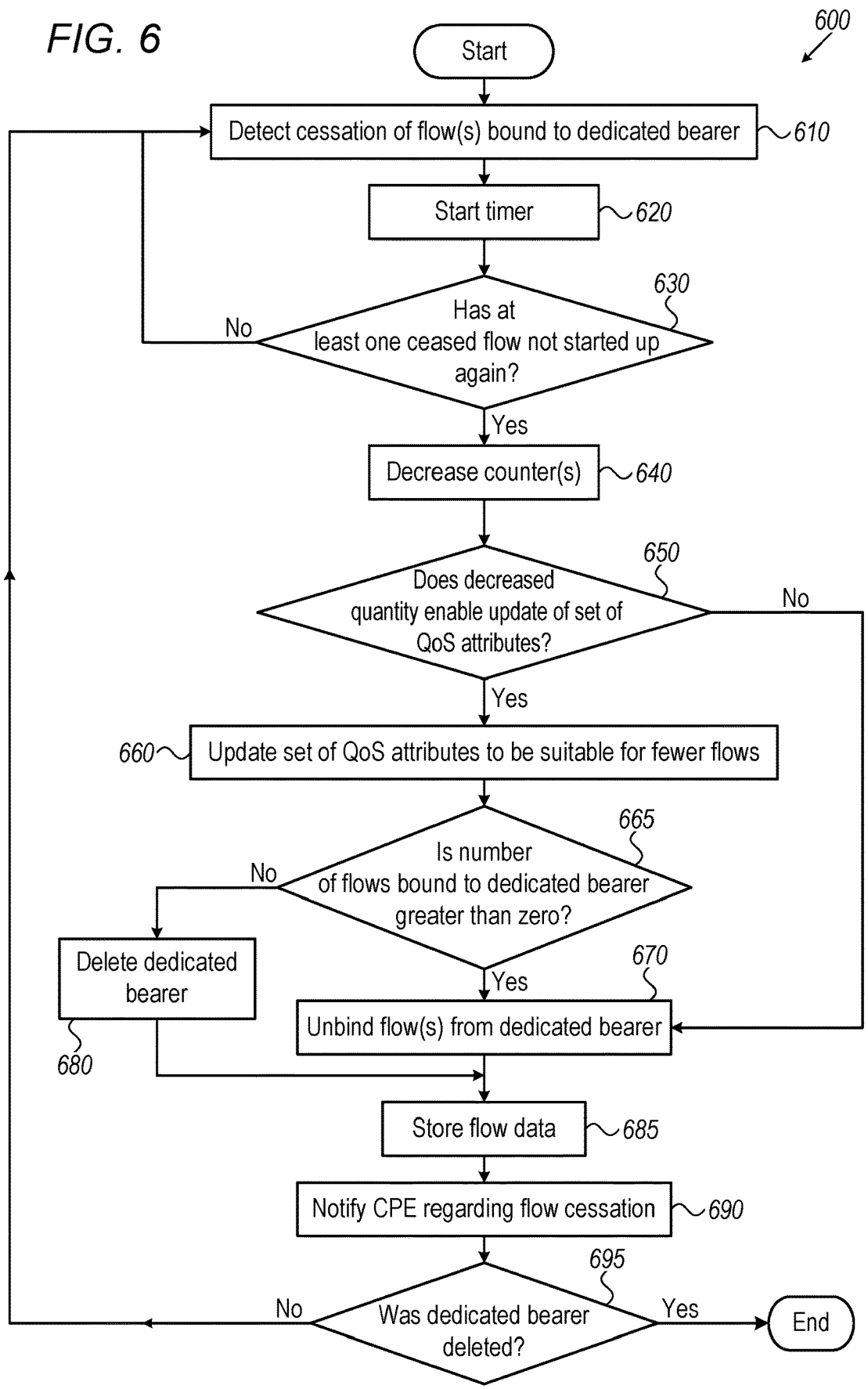
FIG. 6 is another flowchart of a method, in accordance with some embodiments of the presently disclosed subject matter.

FIG. 6 is a flowchart of a method 600, in accordance with some embodiments of the presently disclosed subject matter. Method 600 is described with reference to a particular dedicated bearer that is being used for a particular CPE (e.g. CPE 152), but may be performed for any dedicated bearer being used in system 100.

It is assumed that there may be certain quantity/ies of flows associated with a particular CPE (e.g. CPE 152). For example the quantity/ies of flows may include: quantity of flows per dedicated bearer having a GBR, quantity of flows per APN per group of non-GBR bearer(s) for the particular CPE, and/or quantity of flows per group of non-GBR bearer(s) for APN(s) for the particular CPE. Each quantity may be equal to or less than an associated current bucket size (i.e. equal to or less than the highest value of the associated current bucket). In some embodiments, for efficient use of resources of system 100, each quantity may also be greater than the next lower level associated bucket size (i.e. greater than the highest value of the next lower level associated bucket). Associated buckets sizes may be in accordance with the association data (e.g. more specifically flow bucket data), and therefore the next lower bucket size may be determined from such flow bucket data. For example, referring to Table 8 if the current bucket is shown in the first column of the last row, then the next lower level bucket is as shown in the first column of the second to last row). Flows may have been bound to one or more default and/or dedicated bearers for the particular CPE, for example, in accordance with method 200.

In stage 610, service anchor 115 detects that one or more flows that are bound to a particular dedicated bearer have ceased being received by service anchor 115, at least temporarily. For example, service anchor 115 may monitor the flows, and watch for no activity for a configured duration.

The one of more flows that have ceased may be associated with enterprise application(s) executing on the particular CPE and/or on device(s) behind the particular CPE; and the particular CPE may have sent packet(s) of the flow(s) to, and/or may have received packet(s) of the flow(s) from, service anchor 115 prior to cessation of the flows.

In stage 620, service anchor 115 starts (or in other words sets) an idle timer.

In stage 630, upon expiration of the idle timer, service anchor 115 determines whether at least one of the flow(s) that ceased has not started up again (or in other words, determines if for at least one of the flow(s) no additional packet(s) of the flow have been received at service anchor 115 since the timer was set).

If the flow(s) that ceased have started up, then method 600 iterates to wait for the next occurrence of stage 610.

If at least one of the flow(s) that ceased has not started up, then in optional stage 640, service anchor 115 decreases one or more counters, counting one or more respective quantities of flows, by the quantity of flows which ceased and have not started up. For example, the respective quantity/ies may include: a quantity of flows bound to the particular dedicated bearer if the particular dedicated bearer has a GBR; a quantity of flows bound to relevant non-GBR bearer(s) for the relevant APN for the particular CPE if the particular dedicated bearer does not have a GBR; and/or a quantity of flows bound to relevant non-GBR bearer(s) for the APN(s) for the particular CPE if the particular dedicated bearer does not have a GBR. Stage 640 may be omitted, for instance, if method 600 may be performed without such a counter.

If at least one of the flow(s) that ceased has not started up, then in stage 650, service anchor 115 determines if at least one decreased quantity of flows, decreased due to the flow(s) that ceased and have not started up, enables the set of QoS attributes associated with the particular dedicated bearer to be updated to be suitable for fewer flows. For example, it may be determined if a certain decreased quantity of flows is equal to or less than the next lower level bucket size. The certain decreased quantity of flows may be bound to the particular dedicated bearer if the particular dedicated bearer has GBR; may be bound to relevant non-GBR bearer(s) for the relevant APN for the particular CPE if the particular dedicated bearer does not have a GBR; or may be bound to relevant non-GBR bearer(s) for APN(s) for the particular CPE if the particular dedicated bearer does not have a GBR, etc. It is noted that the certain decreased quantity of flows, which excludes the flow(s) that ceased and have not started up, may be different than if the quantity had been evaluated before the timer was set, if additional flow(s) began, and/or the other flow(s) ceased in the interim.

Stage 660 may be performed if in stage 650 it was determined that the at least one decreased quantity enables the set of QoS attributes associated with the particular dedicated bearer to be updated to be suitable for fewer flows. For example, stage 660 may be performed if it was determined in stage 650 that any decreased quantity is equal to or less than the next lower bucket size. As another example, stage 660 may be performed if it was determined in stage 650 that any decreased quantity is above zero, and equal to or less than the next lower bucket size Otherwise stage 660 may be omitted.

In stage 660, service anchor 115 updates the set of QoS attributes associated with the particular dedicated bearer. The updated set of QoS attributes may be suitable for fewer flows, e.g. fewer flows that are within the range of quantity/ies represented by the next lower level bucket. For example, the MBR, GBR, APN-AMBR, and/or UE-AMBR attributes in the set may be reduced. It is noted that if the range of quantities is greater than one quantity, then the updating may be considered to relate to aggregated flows, meaning not just to the flow(s) that ceased, but also to one or more other flows that may cease in the future.

In stage 665, it is determined whether the number of flows bound to the particular dedicated bearer, excluding the flow(s) that ceased and have not started up, is greater than zero, or is not greater than zero (i.e. is equal to zero). If greater than zero, then stage 670 may be performed. If equal to zero, then stage 680 may be performed.

If it was determined in stage 665 that the number of flows bound to the particular dedicated bearer, excluding the flow(s) that ceased and have not started up, is greater than zero, then in stage 670 service anchor 115 unbinds the flow(s) that ceased and have not started up from the particular dedicated bearer. Service anchor 115 optionally decreases a counter counting the number of flows bound to the particular dedicated bearer by the number of flows that are unbound. For example, such a counter may not be decreased if the quantity/ies discussed in stage 640 include(s) the number of flows bound to the particular dedicated bearer and stage 640 was performed.

If it was determined in stage 665 that the number of flows bound to the particular dedicated bearer, excluding the flow(s) that ceased and have not started up, is equal to zero, then in stage 680 service anchor 115 deletes the particular dedicated bearer. Service anchor 115 optionally unbinds the flow(s) that ceased and have not started up from the particular dedicated bearer and/or optionally decreases a counter counting the number of flows bound to the particular dedicated bearer by the number of flows that are unbound, e.g. before deleting the particular dedicated bearer.

Alternatively, stages 665 and 680 may be omitted, and stage 670 may be performed even if the number of flows equals zero.

Unbinding the flow(s) in stage 670 or stage 680 may include removing the assignment of the flow(s) to the particular dedicated bearer, and therefore the set of QoS attributes associated with the particular dedicated bearer may no longer be necessarily applicable to the flow(s).

In optional stage 685, service anchor 115 may store data (e.g. in memory) relating to the flow(s) that ceased and have not started up. Any appropriate data may be stored such as: identifier(s) of flow(s) that were unbound from the particular dedicated bearer, QoS attributes (e.g. updated attributes) associated with the particular dedicated bearer, deletion of the particular dedicated bearer, decreased quantity/ies of flows (e.g. for the particular dedicated bearer having a GBR; for the relevant APN for the relevant non-GBR bearer(s) for the particular CPE if the particular dedicated bearer does not have a GBR; and/or for the APN(s) for the relevant non-GBR bearer(s) for the particular CPE if the particular dedicated bearer does not have a GBR), next lower level bucket(s) being used (or in other words becoming the current bucket(s)—e.g. more specifically bucket size(s) of next lower level bucket(s) size(s)), etc. Such data may be examples of flow data. The storing may include, adding new data, deleting previously stored data, and/or changing previously stored data. In some embodiments, stage 640 may be performed as part of stage 685; or stage 640 and/or stage 685 may be performed as part of stage 670 or 680.

In stage 690, service anchor 115 notifies the particular CPE of one or more of the following regarding operations performed in method 600 due to flow cessation: identifier(s) of flow(s) that were unbound from the particular dedicated bearer, any QoS attributes that were updated, deletion of the particular dedicated bearer, decreased quantity/ies of flows (e.g. as described above with reference to stage 680), next lower level bucket(s) being used (e.g. more specifically bucket size(s) of next lower level bucket(s)), etc.

If the particular dedicated bearer was not deleted (stage 695), then method 600 iterates to wait for the next occurrence of stage 610 for the particular dedicated bearer. If the particular dedicated bearer was deleted, then method 600 ends for the particular dedicated bearer.

In method 600 an idle timer is run, in case any flow that is bound to the particular dedicated bearer starts up again after an idle timer was set for the flow, and/or in case an additional flow is bound to the particular dedicated bearer, before the particular dedicated bearer is deleted due to the cessation of activity by bound flow(s). Such a timer may therefore reduce the frequency of flow binding, flow unbinding, dedicated bearer updating, dedicated bearer deletion and/or dedicated bearer creation. However, in other embodiments, a timer may not be run. In the latter embodiments, flows may be unbound and/or dedicated bearers may be deleted sooner after a cessation in activity.

The particular dedicated bearer may be deleted upon disconnection of the PDN connection associated with the particular dedicated bearer for the particular CPE, if not occurring earlier on in an iteration of stage 680.

Method 600 may be performed for other dedicated bearer(s) during IP connectivity between the particular CPE (e.g. CPE 152) and mobile network 105, for instance, sequentially and/or in parallel with the performance for the particular dedicated bearer. Method 600 may be additionally or alternatively performed for dedicated bearer(s) associated with other CPE(s) in system 100 sequentially and/or in parallel with the performance for the particular dedicated bearer.

Data flow diagrams 7 and 8 will now be described, in order to further illustrate examples of method 600.

Figure 7:
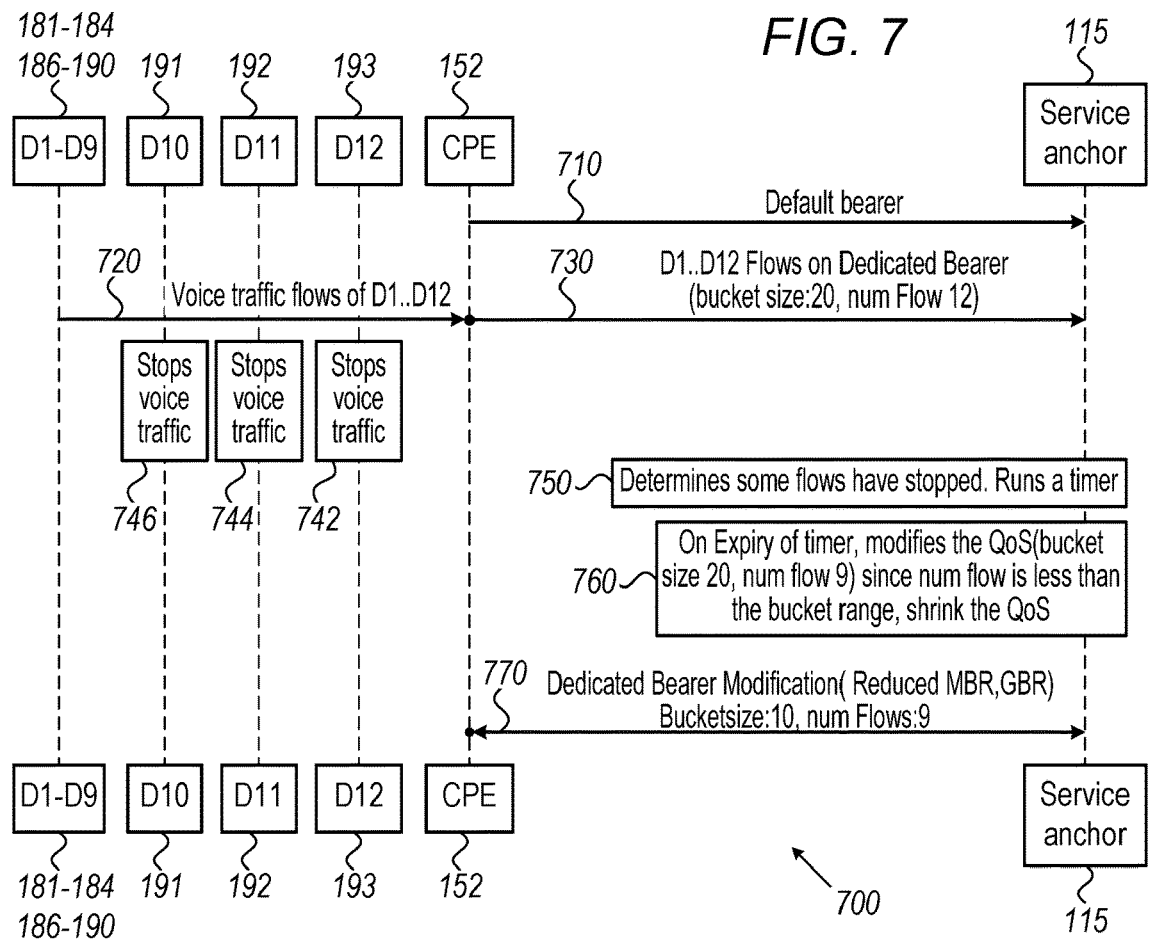
FIG. 7 is a data flow diagram, in accordance with some embodiments of the presently disclosed subject matter.

FIG. 7 is a data flow diagram 700, in accordance with some embodiments of the presently disclosed subject matter.

FIG. 7 refers to twelve devices 181, 182, 183, 184, 186, 187, 188, 189, 190, 191, 192 and 193 behind CPE 152. FIG. 7 also refers to CPE 152, and service anchor 115.

In stage 710, a default bearer is created, as in stage 404 of FIG. 4 discussed above.

In stage 720, voice traffic flows from D1-D12 181, 182, 183, 184, 186, 187, 188, 189, 190, 191, 192 and 193 are sent to CPE 152. In stage 730, CPE 152 sends the voice traffic flows over a dedicated bearer to service anchor 115. The dedicated bearer is associated with a bucket size of 20. For example, stages 720 and 730 may correspond to stages 464 and 468 of FIG. 4.

In stages 742, 744 and 746 respectively, D10 191, D11 192 and D12 193 stop sending respective voice traffic flows.

In stage 750, service anchor 115 detects that three of the flows bound to the dedicated bearer have stopped. Service anchor 115 therefore starts an idle timer. Stage 750 may be an example of stages 610 and 620 of method 600 of FIG. 6 (mutatis mutandis all other refs. to FIG. 6).

Upon expiry of the timer, in stage 760 service anchor 115 updates the set of QoS attributes associated with the dedicated bearer. For example, because the quantity of flows bound to the dedicated bearer now includes only nine flows, the MBR and GBR attributes in the set may be reduced to be suitable for the next lower level bucket (e.g. 1 to 10 flows). Stage 760 may be an example of stage 660 of method 600.

In stage 770, service anchor 115 notifies the CPE of the reduced MBR and GBR, reduced bucket size, and reduced quantity of flows bound to the dedicated bearer, due to flows from D10 191, D11 192 and D12 193 having been unbound from the updated dedicated bearer. Stage 770 may be an example of stage 690 of method 600.

Figure 8:
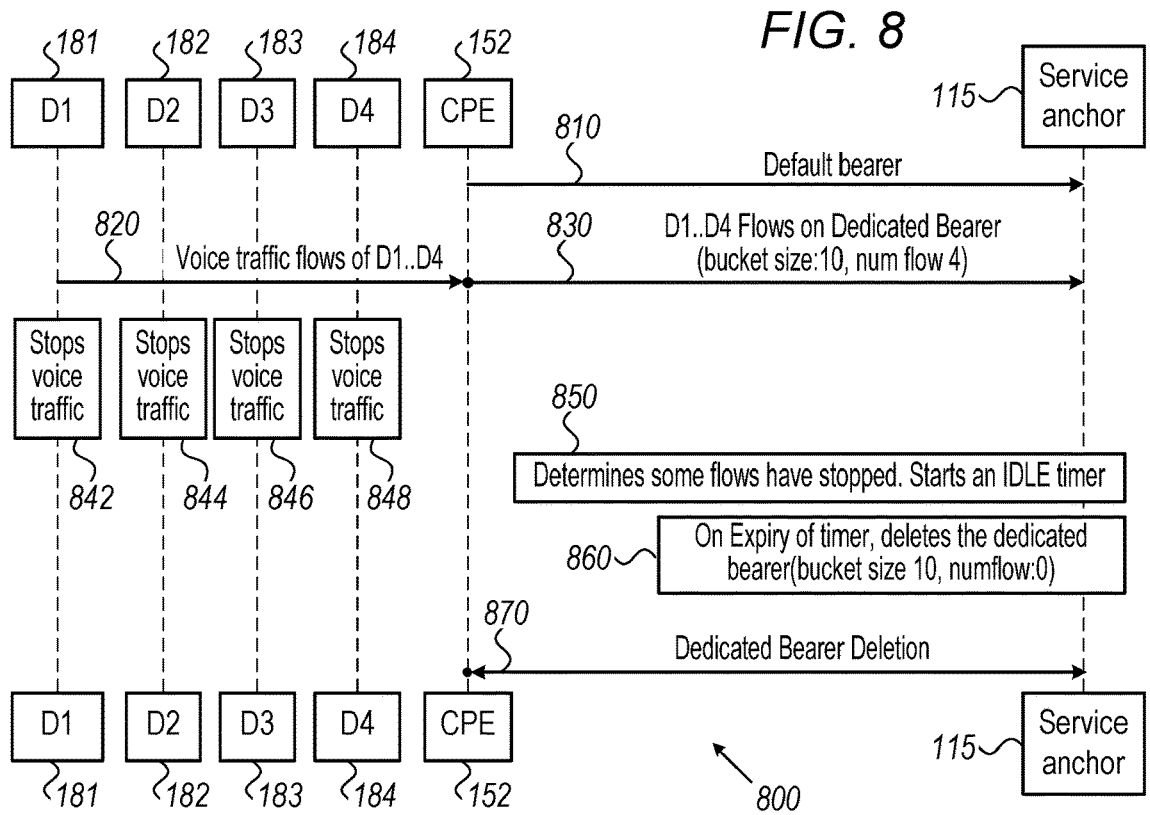
FIG. 8 is another data flow diagram, in accordance with some embodiments of the presently disclosed subject matter.

FIG. 8 is a data flow diagram 800, in accordance with some embodiments of the presently disclosed subject matter.

FIG. 8 refers to four devices D1 181, D2 182, D3 183, D4 184 behind CPE 152.

FIG. 8 also refers to CPE 152, and service anchor 115.

In stage 810, a default bearer is created, as in stage 304 of FIG. 3 discussed above.

In stage 820, voice traffic flows from D1 181, D2 182, D3 183 and D4 184 are sent to CPE 152. In stage 730, CPE 152 sends the voice traffic flows over a dedicated bearer to service anchor 115. The dedicated bearer is associated with a bucket size of 10. Such flows may have been bound to the dedicated bearer in a similar manner to what was described above with reference to FIG. 3 for flows from D1 181, D2 182, and D3 183.

In stages 842, 844, 846 and 848 respectively, D1 181, D2 182, D3 183 and D4 184 stop sending voice traffic.

In stage 850, service anchor 115 detects that the flows bound to the dedicated bearer have stopped. Service anchor 115 therefore starts an idle timer. Stage 850 may be an example of stages 610 and 620 of method 600 of FIG. 6 (mutatis mutandis all other refs. to FIG. 6).

Upon expiry of the timer, in stage 860 service anchor 115 deletes the dedicated bearer. Stage 860 may be an example of stage 680 of method 600.

In stage 870, service anchor 115 notifies the CPE of the deletion of the dedicated bearer. Stage 870 may be an example of stage 690 of method 600.

It should be understood that the subject matter is not bound by the methods described with reference to FIGS. 2 to 8. In some embodiments, one or more methods in accordance with the subject matter may include fewer, more and/or different stages than described with reference to any of FIGS. 2 to 8. For example, an additional stage may include generation of real-time transport protocol control protocol (RTCP) reports regarding the dedicated bearers. Additionally or alternatively, stages may be performed in a different order than described with reference to any of FIGS. 2 to 8; two or more stages that are described as being performed sequentially with reference to any of FIGS. 2 to 8 may be performed concurrently; and/or two or more stages that are described as being performed concurrently with reference to any of FIGS. 2 to 8 may be performed sequentially.

It should further be understood from the description with reference to FIGS. 2 to 8, that for any CPE in system 100, during a duration in which there is IP connectivity between the CPE and service anchor 115 in mobile network 105, a method in accordance with the subject matter may include service anchor 115 varying a pool of (or in other words a collection of zero or more) dedicated bearers for binding flows, in response to at least part of changes occurring during the duration with respect to the flows. For example, the number of flows may change during the duration as flows start up and stop. As another example, the characteristics of flows may change. Continuing with describing the latter example, even if the number of flows remains the same, the characteristics may differ as different flows start up while other flows stop.

The variation in the pool may include, for instance, updating a set of QoS attributes associated with a dedicated bearer in the pool to be suitable for a different (e.g. larger or smaller) quantity of flows than a previous quantity of flows for which the set of Qos attributes was previously suitable. QoS attributes such as MBR, GBR, APN-AMBR and/or UE-AMBR may be updated, for instance, by reducing and/or increasing such attribute(s). In some embodiments, an update of a set of QoS attributes may modify a range of quantity/ies (or in other words bucket) for which the set is suitable, where the range includes at least two quantities, and therefore in such embodiments, the updating may be considered to relate to aggregated flows, rather than just to one flow. In such embodiments, after updating the set, the set may not need to be updated for up to a given number of other flow(s), if such other flows occur (e.g. in the future), where the given number may be, for instance, one less than the number of quantities included in the range.

The variation in the pool, may additionally or alternatively include increasing and/or reducing the quantity of dedicated bearers in the pool by creating new dedicated bearers and/or deleting dedicated bearers. In some embodiments, a new dedicated bearer may be associated with a set of quality of service attributes that is suitable for binding current flow(s), or in other words flow(s) which had begun to be received by service anchor 115 (e.g. at least one packet per flow received) before the creation of the new dedicated bearer; and for binding future flow(s), or in other words flow(s) which begin to be received by service anchor 115 (e.g. first packet per flow received) after the creation of the new dedicated bearer. For example, QoS attributes in the set such as MBR, GBR, APN-AMBR and/or UE-AMBR may be suitable for binding current and future flows.

In some embodiments, the pool may not be varied for certain changes. For example, if the dedicated bearers that are in the pool are associated with respective sets of quality of service attributes that are suitable for the flows both prior to a change (e.g. change in number of flows and/or in characteristics of flows), and subsequent to the change, then the pool may not need to be varied. Continuing with describing such an example, the pool may not be varied for an additional flow, if the flow may be bound to an existing dedicated bearer as described above with reference to stage 240 of FIG. 2.

Figure 9:
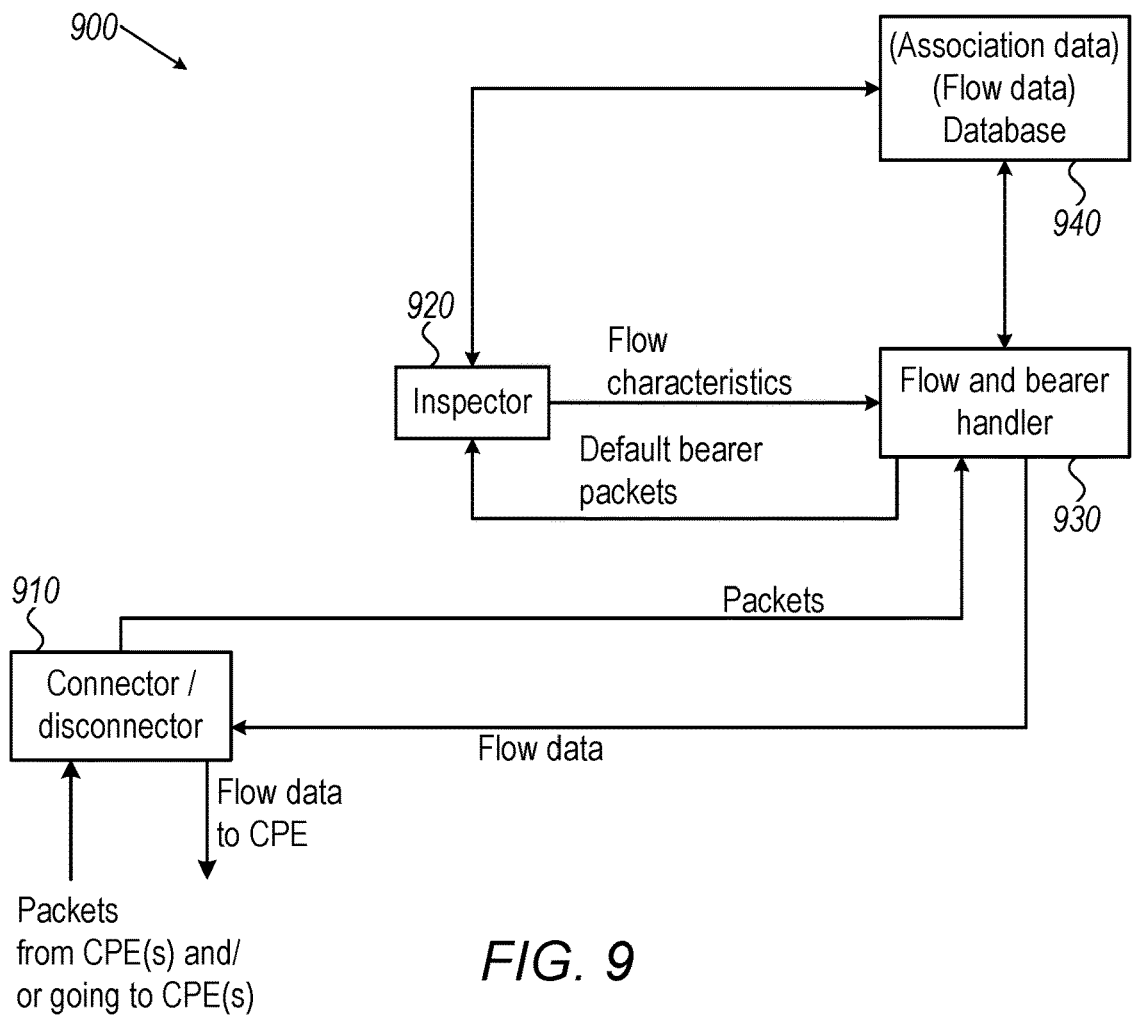
FIG. 9 is a functional block diagram of a service anchor, in accordance with some embodiments of the presently disclosed subject matter.

FIG. 9 is a functional block diagram of a service anchor 900, in accordance with some embodiments of the presently disclosed subject matter. Service anchor 900 may be an example of service anchor 115.

As shown in FIG. 9, service anchor 900 includes a connector/disconnector 910, an inspector 920, a flow and bearer handler 930, and a database 940.

Connector/disconnector 910 may be adapted to provide/remove IP connectivity for any CPE (such as CPE 152) in system 100 (FIG. 1) (e.g. including to establish/terminate one or more PDN connections with any CPE); and to communicate with any CPE (e.g. via a RAN 140 of mobile network 105-FIG. 1). Additionally or alternatively, connector/disconnector 910 may be adapted to communicate with other element(s) external to service anchor 900 (e.g. in private network core 120, etc.) which provide packets to service anchor 900 that will be going to any CPE (e.g. via RAN 140), and/or which receive packets from service anchor 900 that service anchor 900 received from any CPE (e.g. via RAN 140). For example connector/disconnector may be adapted to perform any of stages 205, 210, 270, 275, 280 (FIG. 2) or 690 (FIG. 6), and/or corresponding stage(s) in FIGS. 3, 4, 5, 7, and/or 8. Continuing with describing such an example, connector/disconnector 910 may notify any CPE in stage 270 or 690, for instance of appropriate flow data provided by flow and bearer handler 930.

Packets received by connector/disconnector 910 (e.g. from any CPE and/or which will be going to any CPE in system 100) may proceed to flow and bearer handler 930. For example, such packets may have originated from any of device(s) 180, device(s) 195, external network(s) such as the Internet, etc.

Packets that were sent over and/or will be sent over default bearer(s) ("default bearer packets") from and/or to any CPE may proceed from flow and bearer handler 930 to inspector 920, for inspection. In some embodiments, packets included in a flow, for which a decision was previously made (e.g. in stage 230) to retain the binding of the flow to the default bearer, may not proceed to inspector 920, for inspection but may proceed (not shown) to the respective destination(s) external to service anchor 900 via connector/disconnector 910. For example, such packets may proceed to private network core 120 for routing to destination, e.g. to device(s) 180, to device(s) 195, to external network(s) such as the Internet, etc.

Inspector 920 may be adapted to inspect packets that are being sent over default bearer(s) from any CPE, such as CPE 152, in system 100. For example, inspector 920 may be adapted to perform any of stages of 215, 220 and/or corresponding stage(s) in FIGS. 3, 4, and/or 5. Optionally, inspector 920 is adapted to use configuration data included in association data in database 940 (e.g. such as data shown in Tables 1 to 4) in detecting flow characteristics. After being inspected by inspector 920, the packets may proceed (not shown) to the respective destination(s) external to service anchor 900 via connector/disconnector 910. For example, the packets may proceed to private network core 120 for routing to destination, e.g. to device(s) 180, to device(s) 195, to external network(s) such as the Internet, etc. The flow characteristics determined by inspector 910 may be provided to flow and bearer handler 930, e.g. triggering appropriate action(s) by flow and bearer handler 930.

Flow and bearer handler 930 may be adapted to bind and unbind flows to bearers. Additionally or alternatively, flow and bearer handler 930 may be adapted to vary a pool of dedicated bearers by creating new dedicated bearers, deleting dedicated bearers and/or updating sets of QoS attributes associated with dedicated bearers. For example, flow and bearer handler 930 may be adapted to perform any of stages 225 to 265 of FIG. 2, any of stages 610 to 685 of FIG. 6, and/or any corresponding stage(s) in FIGS. 3, 4, 5, 7, and/or 8.

Optionally flow and bearer handler 930 is adapted to use association data in database 940 (such as configuration data shown in Tables 5 to 7 and/or flow bucket data shown in Tables 8 to 9) in performing e.g., any of stages 225 to 239, 250 and/or 255 of FIGS. 2, 650 and/or 660 of FIG. 6 and/or any corresponding stage(s) in FIGS. 3, 4, and/or 5. Optionally, flow and data handler 930 is adapted to use flow data in database 940 in performing e.g., any of stages 232 to 265, any of stages 610 to 685 of FIG. 6, and/or any similar stage(s) in FIGS. 3, 4, 5, 7, and/or 8. For example, flow data in database 940 may include data described elsewhere herein (e.g. stage 265 of FIG. 2, stage 685 of FIG. 6, etc.) Flow data may additionally or alternatively include data such as shown in Table 10 below.

TABLE 10

| Dedicated bearer identifier | QCI | GBR yes/no | MBR/GBR or APN-MBR or UE-AMBR or bucket size | quantity of bound flows | Flow identifier | Idle? |
|---|---|---|---|---|---|---|
| 1 | 1 | yes | 300/200 | 3 | 5-tuple 1 | No |
| 1 | 1 | yes | 300/200 | 3 | 5-tuple 2 | 30 ms |
| 1 | 1 | yes | 300/200 | 3 | 5-tuple 3 | No |
| 2 | 7 | no | 800 | 15 | 5-tuple 18 | No |

Table 10 shows data regarding two dedicated bearers, identified as 1 and 2. The first dedicated bearer is associated with a QCI of 1, a guaranteed bit rate, an MBR/GBR of 300/200 (based on which a bucket size of 10 may be derived from association data such as shown in Table 8 above), and three bound flows (e.g. the value of a counter counting the quantity of flows). Each of the three flows is identified by the 5-tuple of the flow or by any other suitable identifier such as SDF discussed above. In table 10, the 5-tuples are respectively labeled as 1, 2, and 3. The first and third flows are active and therefore not idle (e.g. no idle timer has been set for the first and third flows). The second flow is not currently active and 30 milliseconds is shown (e.g. the time remaining on an idle timer) before the second flow would be unbound, if activity is not resumed beforehand.

The second dedicated bearer is associated with a QCI of 7, no guaranteed bit rate, an APN-AMBR of 800 (based on which a bucket size of 20 may be derived from association data such as shown in Table 9 above), and fifteen bound flows. One of the bound flows, identified by the respective 5-tuple (e.g. the eighteenth 5-tuple in the data) or by any other appropriate identifier is shown as currently active and therefore no timer has been set for the flow. The other fourteen bound flows are not shown, for simplicity's sake. It is noted that the quantity of flows bound to other bearer(s), if any, that are with QCI of 7, no guaranteed bit rate, for the same CPE, and for the same APN, may be relevant to the bucket size, and therefore not necessarily five (i.e. twenty minus fifteen) more flows may be bound to the dedicated bearer before reaching the bucket size.

In other embodiments, the data regarding dedicated bearers may vary from the data shown in Table 10. For example, whether or not the dedicated bearer has a GBR may be determined inherently from whether or not the GBR is listed. As another example, the bucket size may be listed in addition to or instead of the MBR/GBR, APN-AMBR, and/or UE-AMBR.

Packet(s) of a flow associated with any CPE and which is bound to a dedicated bearer may proceed (not shown) from flow and bearer handler 930 to the respective destination(s) external to service anchor 900 via connector/disconnector 910. For example, the packets may proceed to private network core 120 for routing to destination, e.g. to device(s) 180, to device(s) 195, to external network(s) such as the Internet, etc.

In some embodiments, service anchor 900 may be a user plane anchor of packet core 110 of mobile network 105 (FIG. 1). For instance, a packet data network gateway (PGW) may correspond to the user plane anchor, e.g. if mobile network 105 is a 4G network.

In some other embodiments, service anchor 900 may be distributed between a user plane anchor and a node that is independent of the user plane anchor. For instance, inspector 920 and part of database 940 may be comprised in an independent node; and the user plane anchor may comprise connector/disconnector 910, flow and bearer handler 930 and another part of database 940. In the latter embodiments, the independent node may, for instance, be in packet core 115, e.g. more specifically in the SGi interface, such as between the user plane anchor and private network core 120.

In some embodiments where service anchor 900 is distributed such that inspector 920 is in an independent node separate from the user plane anchor, the independent node and the user plane anchor may be adapted to signal to one another.

Regardless of the configuration of service anchor 900 (e.g. whether service anchor 900 is a user plane anchor, or is distributed between an independent node and the user plane anchor), inspection by inspector 920 may directly trigger the binding to dedicated bearers by flow and bearer handler 930, and/or may trigger certain type(s) of variation in the pool of dedicated bearers by flow and bearer handler 930 (e.g. dedicated bearer creation; updating in accordance with stage 250 of method 200; etc.) Therefore, no policy and charging rules function (PCRF) need be used to trigger dedicated bearer creation, etc.

Figure 10:
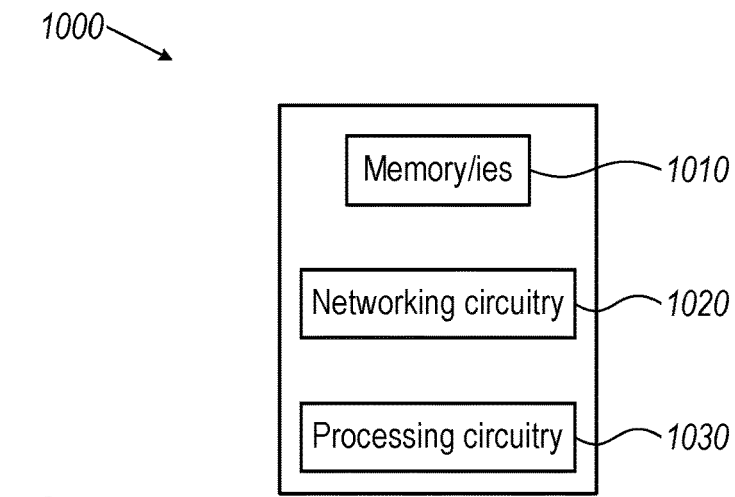
FIG. 10 is a block diagram of an apparatus for implementing a service anchor, in accordance with some embodiments of the presently disclosed subject matter.

FIG. 10 is a block diagram of an apparatus 1000 for implementing service anchor 115 (or more specifically example service anchor 900), in accordance with some embodiments of the presently disclosed subject matter.

Apparatus 1000 includes memory/ies 1010, networking circuitry 1020, and processing circuitry 1030.

Processing circuitry 1030 may be adapted to perform at least part of the functionality attributed herein to service anchor 115. More specifically processing circuitry may implement inspector 920 and flow and bearer handler 930 of example service anchor 900 of FIG. 9 (or in other words may be adapted to perform the functionality attributed herein to inspector 920 and flow and bearer handler 930). Processing circuitry 1030 may include, for instance any of the following: processor(s), state machine(s), other type(s) of integrated circuit(s) comparator(s), adder(s), multiplier(s), combinatory logic (such as multiplexer(s), OR gate(s), AND gate(s), XOR gate(s) etc.), electronic component(s) (e.g. resistor(s), inductor(s), capacitor(s), diode(s), transistor(s), other switching component(s), etc.), wiring, etc. Processing circuitry 1030 may additionally or alternatively include one or more integrated circuits (e.g. field programmable gate array(s) (FPGA(s)), application specific integrated circuit(s) (ASIC(s)), full-custom integrated circuit(s), etc.), printed circuit boards (also referred to as printed circuit board assemblies), and/or the like, which may for instance comprise circuitry (such as examples of processing circuitry 1030 described in the previous sentence) that is suitable for inclusion in such integrated circuit(s), printed circuit board(s) and/or the like. If processor(s) are included in processing circuitry 1030, each included processor may be of any suitable type operative to execute instructions, such as a load store processor, a processing pipe, a programmable very long instruction word (VLIW) engine, etc. Processor(s) may include, for example, any of the following: graphics processing unit(s) (GPU(s)), digital signal processor(s) (DSP(s)) central processing units (CPU(s)), etc. Any apparatus 1000, or part of apparatus 1000, which includes processing circuitry 1030 is also referred to herein as a computer.

Memory/ies 1010 may store data for use by processing circuitry 1030. For example, the stored data may include flow data and/or association data discussed above. Continuing with describing such an example, memory/ies 1010 may implement, for instance, database 940 of example service anchor 900 of FIG. 9. The stored data may additionally or alternatively include software (also referred to herein as computer readable program code), e.g. if the processing circuitry includes processor(s) adapted to execute such computer readable program code in order to perform at least part of the functionality attributed herein to service anchor 115 (e.g. more specifically attributed herein to inspector 920 and/or to flow and bearer handler 930 of example service anchor 900). Software may include firmware, if appropriate. Each memory 1010 (also referred to herein as a computer readable storage medium) may be of any appropriate type such as an optical computer readable storage medium, a magnetic computer readable storage medium, or an electronic computer readable storage medium. If there is a plurality of memories 1010, any two memories 1010 in the plurality may be of the same type or different types of memories. Memory/ies 1010 may include for instance, any of the following: volatile, non-volatile, erasable, non-erasable, removable, non-removable, writeable, re-writeable memory, for short term storing, for long term storing, etc., such as registers, read-only memory (ROM), static random access memory (SRAM), dynamic random access memory (DRAM), flash memory, embedded DRAM, etc.

Networking circuitry 1020 may be adapted to perform at least part of the functionality attributed herein to service anchor 115. More specifically, networking circuitry 1020 may implement connector/disconnector 910 of example service anchor 900 (or in other words may be adapted to perform the functionality attributed herein to inspector connector/disconnector 910). For example, networking circuitry 1020 may provide connection(s) to a radio access network (e.g. RAN 105), to private network core (e.g. private network core 120), etc. Optionally, networking circuitry 1020 may provide interconnections for signaling between different physical units (also referred to as sub-apparatuses) of apparatus 1000, e.g. if the different physical units respectively implement a user plane anchor, and a node independent of the user plane anchor. Networking circuitry 120 may include, for instance wired network interface(s), wired network switch(es), etc.

In some embodiments, apparatus 1000 may be adapted to perform other functionality in addition to functionality which was described herein, e.g. with reference to FIGS. 1 to 10. For example, the other functionality may include functionality provided by Cisco® ASR5K or Cisco ASR5550.

It should be understood that the functional blocks of FIG. 9 and the elements of FIG. 10 are directed to certain embodiments, and that in some other embodiments, functionality attributed herein to any two or more functional blocks and/or elements may be performed by a consolidated functional block and/or element; functionality attributed herein to any single functional block and/or element, may be distributed among two or more functional blocks and/or elements; and/or functionality attributed herein to a particular functional block and/or element may be performed in addition or instead by one or more other functional blocks and/or elements. Additionally or alternatively, the arrows shown in FIG. 9 between various functional blocks may vary in some other embodiments.

It should also be understood that the subject matter contemplates, for example, a computer program product comprising a computer readable storage medium having computer readable program code embodied therein which when executed by a computer causes the computer to perform any of the methods described herein, or any part thereof. Further contemplated, for example, is such computer readable program code. Further contemplated, for example, is such a computer readable storage medium.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method comprising:
receiving, at a mobile network operated by a service provider, a flow associated with an enterprise application, wherein the enterprise application is executing on a customer premises equipment of an enterprise network or on a device behind the customer premises equipment;
binding the flow to a particular dedicated bearer associated with a particular set of quality of service attributes suitable for binding the flow, wherein one or more characteristics of the flow were detected based on an inspection of one or more packets of the flow, and wherein the binding includes:
determining whether or not there is any existing dedicated bearer associated with quality of service attributes suitable for binding the flow, and
upon determination that there is at least one existing dedicated bearer associated with the quality of service attributes suitable for binding the flow, binding the flow to one of the at least one existing dedicated bearer associated with the quality of service attributes suitable for binding the flow, the one of the at least one existing dedicated bearer being the particular dedicated bearer and a set of quality of service attributes associated with the one of the at least one existing dedicated bearer being the particular set of quality of service attributes, or
upon determination that there is no existing dedicated bearer associated with the quality of service attributes suitable for binding the flow, then, depending on at least one criterion, performing one of:
updating an existing set of quality of service attributes associated with an existing dedicated bearer, yielding an updated set of quality of service attributes suitable for binding the flow, and binding the flow to the existing dedicated bearer, the existing dedicated bearer being the particular dedicated bearer and the updated set of quality of service attributes being the particular set of quality of service attributes, or
creating a new dedicated bearer associated with a new set of quality of service attributes that is suitable for binding the flow, and binding the flow to the new dedicated bearer, the new dedicated bearer being the particular dedicated bearer and the new set of quality of service attributes being the particular set of quality of service attributes and;

upon detecting that the flow has stopped:
setting an idle timer;
if the flow has not started up again before the idle timer has expired performing at least one of: unbinding the flow from the particular dedicated bearer or deleting the particular dedicated bearer; and
updating the particular set of quality of service attributes to be suitable for fewer flows if the flow has not started up again before the idle timer has expired and if at least one decreased quantity of flows, decreased due to stopping of the flow, enables the particular set of quality of service attributes to be updated to be suitable for fewer flows.

2. The method of claim 1, wherein upon determination that there is no existing dedicated bearer associated with the quality of service attributes suitable for binding the flow, then the performing includes updating the existing set of quality of service attributes to be suitable for binding the flow and at least one other future flow, if occurring, or creating the new set of quality of service attributes to be suitable for binding the flow and the at least one other future flow, if occurring.

3. The method of claim 1, wherein the at least one criterion includes one or more of:
whether or not any of maximum bit rate, guaranteed bit rate, access point name-aggregate maximum bit rate or user equipment-aggregate maximum bit rate attributes included in the existing set of quality of service attributes is below a predetermined value for a quality of service class identifier included in the existing set of quality of service attributes,
whether or not updating is allowed,
whether or not dedicated bearer creation is allowed, or
whether or not the existing set of quality of service attributes includes any of allocation and retention priority, the quality of service class identifier, or guaranteed bit rate/non-guaranteed bit rate attributes suitable for binding the flow.

4. The method of claim 1, further comprising:
determining whether or not to bind the flow to the particular dedicated bearer, wherein the binding is performed if determined to bind the flow.

5. The method of claim 1, wherein the method is performed by a user plane service anchor of the mobile network.

6. The method of claim 1, wherein the customer premise equipment has a Packet Data Network (PDN) connection with the mobile network.

7. The method of claim 6, wherein the received flow is initially bound to a default bearer for the PDN connection of the customer premise equipment with the mobile network.

8. The method of claim 1, wherein the inspection of the one or more packets of the flow includes performing a deep inspection or a shallow inspection of the one or more packets of the flow.

9. An apparatus comprising:
one or more networking circuits that receive, at a mobile network operated by a service provider, a flow associated with an enterprise application, wherein the enterprise application is executing on a customer premises equipment of an enterprise network or on a device behind the customer premises equipment;
one or more processing circuits that bind the flow to a particular dedicated bearer associated with a particular set of quality of service attributes suitable for binding the flow, wherein one or more characteristics of the flow were detected based on an inspection of one or more packets of the flow, and wherein the one or more processing circuits bind the flow by:
determining whether or not there is any existing dedicated bearer associated with the quality of service attributes suitable for binding the flow, and
upon determination that there is at least one existing dedicated bearer associated with the quality of service attributes suitable for binding the flow, binding the flow to one of the at least one existing dedicated bearer associated with the quality of service attributes suitable for binding the flow, the one of the at least one existing dedicated bearer being the particular dedicated bearer and a set of quality of service attributes associated with the one of the at least one existing dedicated bearer being the particular set of quality of service attributes, or
upon determination that there is no existing dedicated bearer associated with quality of service attributes suitable for binding the flow, then, depending on at least one criterion, performing one of:
updating an existing set of quality of service attributes associated with an existing dedicated bearer, yielding an updated set of quality of service attributes suitable for binding the flow, and binding the flow to the existing dedicated bearer, the existing dedicated bearer being the particular dedicated bearer and the updated set of quality of service attributes being the particular set of quality of service attributes, or
creating a new dedicated bearer associated with a new set of quality of service attributes that is suitable for binding the flow, and binding the flow to the new dedicated bearer, the new dedicated bearer being the particular dedicated bearer and the new set of quality of service attributes being the particular set of quality of service attributes; and the one or more processing circuits, upon detecting that the flow has stopped:
set an idle timer;
if the flow has not started up again before the idle timer has expired perform at least one of: unbinding the flow from the particular dedicated bearer or deleting the particular dedicated bearer; and
update the particular set of quality of service attributes to be suitable for fewer flows if the flow has not started up again before the idle timer has expired and if at least one decreased quantity of flows, decreased due to stopping of the flow, enables the particular set of quality of service attributes to be updated to be suitable for fewer flows.

10. The apparatus of claim 9, wherein upon determination that there is no existing dedicated bearer associated with quality of service attributes suitable for binding the flow, then the performing includes updating the existing set of quality of service attributes to be suitable for binding the flow and at least one other future flow, if occurring, or creating the new set of quality of service attributes to be suitable for binding the flow and the at least one other future flow, if occurring.

11. The apparatus of claim 9, wherein the at least one criterion includes one or more of:
whether or not any of maximum bit rate, guaranteed bit rate, access point name-aggregate maximum bit rate or user equipment-aggregate maximum bit rate attributes included in the existing set of quality of service attributes is below a predetermined value for a quality of service class identifier included in the existing set of quality of service attributes, whether or not updating is allowed, whether or not dedicated bearer creation is allowed, or whether or not the existing set of quality of service attributes includes any of allocation and retention priority, the quality of service class identifier, or guaranteed bit rate/non-guaranteed bit rate attributes suitable for binding the flow.

12. The apparatus of claim 9, wherein the one or more processing circuits determine whether or not to bind the flow to the particular dedicated bearer, wherein the binding is performed if determined to bind the flow.

13. The apparatus of claim 9, wherein the apparatus is a user plane service anchor of the mobile network.

14. The apparatus of claim 9, wherein the inspection of the one or more packets of the flow includes performing a deep inspection or a shallow inspection of the one or more packets of the flow.

15. The apparatus of claim 9, wherein the received flow is initially bound to a default bearer for a Packet Data Network (PDN) connection of the customer premise equipment with the mobile network.

16. A non-transitory computer readable storage medium comprising:

computer readable program code for causing a computer to receive, at a mobile network operated by a service provider, a flow associated with an enterprise application, wherein the enterprise application is executing on a customer premises equipment of an enterprise network or on a device behind the customer premises equipment;

computer readable code for causing the computer to bind the flow to a particular dedicated bearer associated with a particular set of quality of service attributes suitable for binding the flow, wherein one or more characteristics of the flow were detected based on an inspection of one or more packets of the flow, by:

determining whether or not there is any existing dedicated bearer associated with the quality of service attributes suitable for binding the flow, and upon determination that there is at least one existing dedicated bearer associated with the quality of service attributes suitable for binding the flow, binding the flow to one of the at least one existing dedicated bearer associated with the quality of service attributes suitable for binding the flow, the one of the at least one existing dedicated bearer being the particular dedicated bearer and a set of quality of service attributes associated with the one of the at least one existing dedicated bearer being the particular set of quality of service attributes, or upon determination that there is no existing dedicated bearer associated with quality of service attributes suitable for binding the flow, then, depending on at least one criterion, performing one of:

updating an existing set of quality of service attributes associated with an existing dedicated bearer, yielding an updated set of quality of service attributes suitable for binding the flow, and binding the flow to the existing dedicated bearer, the existing dedicated bearer being the particular dedicated bearer and the updated set of quality of service attributes being the particular set of quality of service attributes, or creating a new dedicated bearer associated with a new set of quality of service attributes that is suitable for binding the flow, and binding the flow to the new dedicated bearer, the new dedicated bearer being the particular dedicated bearer and the new set of quality of service attributes being the particular set of quality of service attributes; and computer readable code for causing the computer, upon detecting that the flow has stopped, to:

set an idle timer;

if the flow has not started up again before the idle timer has expired perform at least one of: unbinding the flow from the particular dedicated bearer or deleting the particular dedicated bearer; and update the particular set of quality of service attributes to be suitable for fewer flows if the flow has not started up again before the idle timer has expired and if at least one decreased quantity of flows, decreased due to stopping of the flow, enables the particular set of quality of service attributes to be updated to be suitable for fewer flows.

17. The non-transitory computer readable storage medium of claim 16, wherein upon determination that there is no existing dedicated bearer associated with quality of service attributes suitable for binding the flow, then the performing includes updating the existing set of quality of service attributes to be suitable for binding the flow and at least one other future flow, if occurring, or creating the new set of quality of service attributes to be suitable for binding the flow and the at least one other future flow, if occurring.

18. The non-transitory computer readable storage medium of claim 16, wherein the at least one criterion includes one or more of:

whether or not any of maximum bit rate, guaranteed bit rate, access point name-aggregate maximum bit rate or user equipment-aggregate maximum bit rate attributes included in the existing set of quality of service attributes is below a predetermined value for a quality of service class identifier included in the existing set of quality of service attributes, whether or not updating is allowed, whether or not dedicated bearer creation is allowed, or whether or not the existing set of quality of service attributes includes any of allocation and retention priority, the quality of service class identifier, or guaranteed bit rate/non-guaranteed bit rate attributes suitable for binding the flow.

19. The non-transitory computer readable storage medium of claim 16, further comprising computer readable code for causing the computer to determine whether or not to bind the flow to the particular dedicated bearer, wherein the binding is performed if determined to bind the flow.

20. The non-transitory computer readable storage medium of claim 16, wherein the inspection of the one or more packets of the flow includes performing a deep inspection or a shallow inspection of the one or more packets of the flow.

* * * * *